United States Patent [19]

White

[11] Patent Number: 5,701,448
[45] Date of Patent: Dec. 23, 1997

[54] DETECTING SEGMENT LIMIT VIOLATIONS FOR BRANCH TARGET WHEN THE BRANCH UNIT DOES NOT SUPPLY THE LINEAR ADDRESS

[75] Inventor: Christopher E. White, Dallas, Tex.

[73] Assignee: Cyrix Corporation, Richardson, Tex.

[21] Appl. No.: 572,949

[22] Filed: Dec. 15, 1995

[51] Int. Cl.$^6$ ................................................ G06F 9/00
[52] U.S. Cl. ........................... 395/580; 395/416; 364/718
[58] Field of Search ............................. 395/375, 425, 395/416; 364/786

[56] References Cited

U.S. PATENT DOCUMENTS

| | | | |
|---|---|---|---|
| 4,851,989 | 7/1989 | Kagimasa et al. | 395/416 |
| 5,313,606 | 5/1994 | Luong et al. | 395/425 |
| 5,357,559 | 10/1994 | Kane et al. | 395/375 |
| 5,394,351 | 2/1995 | Widigen et al. | 364/786 |
| 5,404,467 | 4/1995 | Sabe et al. | 395/375 |
| 5,479,616 | 12/1995 | Garibay, Jr. et al. | 395/375 |
| 5,517,440 | 5/1996 | Widigen et al. | 364/786 |

*Primary Examiner*—Krisna Lim
*Assistant Examiner*—Saleh Najjar
*Attorney, Agent, or Firm*—Andrew S. Viger; John L. Maxin

[57] ABSTRACT

A pipelined 32 bit x86 processor including a prefetch unit and a branch unit. During sequential prefetching, the prefetch unit increments a prefetch physical address PFPA and a corresponding prefetch linear address PFLA—for each prefetch address, the PFLA is compared with the code segment limit linear address CSLA to determine if the corresponding prefetch block of 16 instruction bytes (cache line) contains the segment limit. If a COF hits in the branch unit, it outputs corresponding target address information used to generate a prefetch address—this target address information includes bits [11:0] of the target address (which are the same for the target physical address), i.e., the branch unit does not provide a full PFLA for comparison with the CSLA. Instead, the prefetch unit compares the low order bits [11:0] of the target address supplied by the branch unit with the CSLA—if a partial match occurs indicating that the CSLA address is potentially within such target prefetch block, the prefetch unit asserts a segment limit violation state that inhibits any instruction bytes from the target prefetch block from being transferred to the decoder. When the full target linear address is generated during the address calculation stage, it is compared with the CSLA address—(i) if they do not match, the segment limit violation state is deasserted, or (ii) if they match, the segment limit violation state is adjusted such that the transfer of instruction bytes from the target prefetch block is permitted up to the segment limit as represented by the CSLA address, and then a segment limit violation is signaled.

12 Claims, 12 Drawing Sheets

0,1=PREDICTED NOT TAKEN
2,3=PREDICTED TAKEN
T=ACTUAL TAKEN
NT=ACTUAL NOT TAKEN

DETECTING SEGMENT LIMIT VIOLATIONS FOR BRANCH TARGET WHEN THE BRANCH UNIT DOES NOT SUPPLY THE LINEAR ADDRESS

CROSS REFERENCES

This is related to commonly assigned, co-pending U.S. patent applications: (1) Ser. No. 08/572,948, titled "Prefetch Unit With A Three-Block Prefetch Buffer And Virtual Buffer Management Including Selectively Allocating A Prefetch Buffer For A Branch Target Or The Not-Predicted Path", filed Dec. 15, 1995, (2) Ser. No. 08/572,773, titled, "Detecting Short Branches In A Prefetch Buffer Using Target Location Information In a Branch Target Cache", filed Dec. 15, 1995, (3) Ser. No. 08/572,815 (now abandoned) titled, "Branch Target Cache Storing The L1 Cache Index For A Target", filed Dec. 15, 1995, and (4) Ser. No. 08/572,996, titled, "Detecting Self-Modifying Code In A Pipelined Processor With Branch Processing And Store Buffering", filed Dec. 15, 1995.

BACKGROUND

1. Technical Field

The invention relates generally to computer systems, and more particularly relates to computer processors with prefetch and branch units that prefetch instructions, including prefetching predicted branch target addresses supplied by the branch unit.

In an exemplary embodiment, the invention is used in an x86 processor to improve performance of prefetching and branch processing.

2. Related Art

Processors commonly use pipeline techniques to reduce the average execution time per instruction. An execution pipeline is divided into pipe stages—instructions are executed in stages allowing multiple instructions to be in the execution pipeline at the same time. For example, current x86 processor architectures generally use the following pipe stages:

| | |
|---|---|
| IF | Instruction Fetch (or Prefetch) |
| ID | Instruction Decode, including instruction length decode |
| AC | Address Calculation or Operand Access, including register file access, and for memory references, address calculation for operand load (either from cache or external DRAM) |
| EX | Execute, including arithmetic, logical, and shift operations |
| WB | Writeback of execution results, either writeback to the register file writeback or store to memory (cache or DRAM) |

In particular, to keep the pipeline full, a prefetcher fetches instruction bytes into a prefetch buffer—instruction bytes are transferred to a decoder for decoding into instructions for execution in later stages of the pipeline. As the prefetch buffer is emptied by the decoder, the prefetcher fetches additional instruction bytes either (a) by incrementing the prefetcher IP (instruction pointer), or (b) by switching the code stream in response to a change of flow instruction (such as a branch).

Change of flow (COF) instructions interrupt the code stream, significantly impacting pipeline performance—COFs typically account for 15–30% of the instruction mix. For example, in the x86 instruction set architecture, COFs occur on the average every four to six instructions. COF instructions include branches (including LOOP instructions), jumps, and call/returns—branches are conditional in that the branch may be taken or not taken (depending, for example, on the status of condition codes), while jumps and call/returns are unconditional (always taken). Taken branches and unconditional COFs (UCOFs) interrupt the code stream to cause instruction fetch to proceed from a target address.

Without limiting the scope of the invention, this background information is provided in the context of a general problem to which the invention has application: in a pipelined processor that executes the x86 instruction set, improving performance and efficiency of prefetching and branch processing, and thereby the overall performance of the execution pipeline.

The x86 instruction set architecture (ISA) allows variable length instructions. For the 32-bit and 64-bit x86 architectures (i.e., currently the 486, 586, and 686 generations), instructions can be from 1 to 15 bytes in length (the average instruction is about 2.5 bytes). As a result, instructions will be misaligned in memory—typically, instruction length is decoded during the instruction decode stage of the execution pipeline.

The goal of instruction prefetch is to provide a continuous code stream in the form of instruction bytes to the decoder (thereby maintaining a continuous flow of instructions for execution). Some 4866 generation microprocessor used a two-block prefetch buffer operated as a circular queue—a current block and used to buffer instruction bytes being delivered to the decoder, while the other block was used in prefetching the next block of instruction bytes. Prefetch performance is significantly impacted by COF instructions.

The 486 generation microprocessors do not have a branch unit to provide dynamic prediction of branch direction—rather, branches are statically predicted not-taken and LOOPs are statically predicted taken. For branches, prefetching continues along the not-taken (fall through) path, and the execution pipe is flushed if the branch resolves taken in EX. For LOOPs, the prefetcher stalls until the target is fetched during AC/EX.

To improve pipeline performance on COFs, 586 and 686 generation microprocessors have included branch processing units to predict the direction of branches, and in the case of predicted taken branches (and UCOFs), to switch the prefetcher to the target address immediately. Branch processing significantly reduces the instances in which the prefetcher and decoder are stalled due to a COF, which is particularly important from a pipeline performance standpoint as execution pipelines are lengthened (for example, by superpipelining a stage, such as address calculation, into two stages.

A branch unit, includes a branch target cache (BTC) as well as branch prediction and branch resolution logic. When a branch is initially decoded and executed, then typically (based on the prediction algorithm), if the branch is taken, its target address is stored in the BTC as a predicted-taken branch (not-taken branches are typically not stored in the BTC)—the next time the branch is detected (during prefetch or decode), the BTC will supply the target address to the prefetcher. For each branch entry, the BTC typically stores (a) a tag identifying the branch instruction, (b) the associated predicted target address, and (c) one or more history bits used by the branch prediction logic—a conventional approach is to use as the BTC tag the address of the instruction prior to the COF to permit prefetching to switch to a predicted taken direction as this prior instruction and the COF instruction are decoding.

In particular, using the address of the instruction prior to the branch as the tag enables the BTC to be accessed, and a predicted-taken target address supplied to the prefetcher, in the clock prior to decoding the branch instruction. In response to a hit in the BTC, the prefetcher switches the code stream in the next clock to the target direction, making the target instruction bytes available to the decoder immediately after decoding the branch instruction (assuming the prefetch target address hits in the cache) without stalling the execution pipeline.

The branch prediction logic implements a prediction algorithm based on the history bits stored with the corresponding branch entry in the BTC. The actual branch direction (taken or not-taken) resolves in EX in response to condition code update—if the branch is mispredicted, branch resolution logic repairs the execution pipeline. Repair of mispredicted branches involves terminating execution of the instructions in the mispredicted direction, restoring the state of the machine, and restarting execution from the correct instruction (including prefetching in the nonpredicted direction)—a branch misprediction results in a branch misprediction penalty corresponding to the number of clocks lost by mispredicting the branch.

Branch units typically store target addresses for all changes of flow—branches and as well as unconditional COFs (UCOFs) such as jumps and call/returns. In the case of UCOFs, no prediction is required, but the stored target address can be used to immediately switch prefetching to the target address (i.e., without waiting for the UCOF to be decoded).

The x86 ISA supports both segmentation and paging, and allows self-modifying code. In 586 and 686 generation processors, using a branch unit to supply target addresses to the prefetcher, and increasing the depth of the execution pipeline, necessitates taking into account segment limit checking and detecting self-modifying code.

Regarding segment limit checking, according to the 32-bit x86 memory management model (protected mode), addresses are generated using segmentation and, if enabled, paging. A code segment is defined by a segment base and segment limit both of which may be arbitrarily set in physical memory—a page is 4Kbytes of physical memory. A segmented linear address (LA) is calculated by adding the segment base address to an offset (effective) address formed by adding two or three address components (relative base, displacement, and index)—this address is also the physical address (PA) if paging is not enabled. If paging is enabled, the physical address is obtained by translating the high order 20 bits [31:12] of the linear address to obtain a page base address—the low order bits [11:0] provide a 4Kbyte offset address within the page. Thus, the low order bits of the linear address and the translated physical address are the same.

Each linear address calculation requires a segment limit check to determine if a linear address crosses the segment boundary. Separate code and data segments are defined—if the prefetcher crosses a code segment boundary, a segment limit violation exception is signaled.

The prefetcher typically maintains the linear and physical address for the current prefetch address (memory aligned), as well as the associated code segment limit. For sequential prefetching, the prefetcher increments the physical address to generate the prefetch address to the cache, and increments the corresponding linear address to detect if the prefetch address crosses the segment boundary (instruction bytes beyond the segment limit are invalidated).

The branch unit typically supplies physical target addresses to the prefetcher—when an entry in the BTC is allocated for a branch instruction, the associated target address is the physical address obtained from the AC stage after linear address calculation and page translation. Supplying a physical target address allows the prefetcher to immediately begin prefetching (accessing the cache) without the necessity of translating a linear address.

The target address supplied by the BTC is the address of the target instruction, which need not be memory aligned—the prefetcher or the cache logic will convert this target address into a memory aligned prefetch address by ignoring the low order bits (for example, bits [4:0] for 16 byte cache lines). Thus, the branch unit may supply a target address that would cause the prefetcher to jump into a prefetch block (i.e., cache line) containing a segment limit—while the prefetcher will have the physical prefetch address, it will not have the corresponding linear address to compare with the code segment limit (i.e., the target linear address is not generated until the COF instruction reaches the AC stage). As a result, the prefetcher may prefetch beyond the segment limit, which is contrary to the 486 specification.

Regarding self-modifying code, the standard 486 specification requires that a write instruction that modifies a "target" instruction be followed immediately by a jump to the modified target instruction—as a result, the target instruction is first modified by the write, and then fetched by the jump for execution. Not all 486 code follows this specification.

For 586 and 686 generation architectures, maintaining compatibility with existing software that includes self-modifying code is made problematic by architectural changes that increase the likelihood that a write to an instruction will not complete before the instruction is fetched. Such architectural features include dynamic branch prediction, increased prefetch buffer size, and store reservation stations (pre-cache write buffers).

SUMMARY

An object of the invention is to improve the performance of prefetching and branch processing, and therefore the overall performance of an execution pipeline, and more particularly, to minimize prefetching stalls when a branch target cache supplies target prefetch information but not the target linear address.

These and other objects of the invention are achieved by a scheme for detecting segment limit violations for branch targets when a branch unit does not supply the linear address. A processor uses a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same). For example, for 32 bit x86 addressing, the low order part of the LA/PA is bits [11:0], with only the high order bits [31:12] being translated.

In one aspect of the invention, a prefetch unit that issues prefetch addresses for prefetch blocks of instruction bytes, and loads prefetch blocks of instruction bytes into a prefetch buffer for transfer to a decoder. A branch unit includes a branch target cache (BTC) that for selected COF instructions provides target address information used to generate a prefetch address. The target address information including at least a portion of the low order part of the LA but not including all of the high order part of the LA.

Limit checking logic stores (i) a CSLA address corresponding to the linear address of the segment limit; (ii) a PFLA address corresponding to the linear address of the next prefetch address to be issued by the prefetch unit; and (iii) a PFPA address corresponding to the physical address of the next prefetch address to be issued by the prefetch unit.

For sequential prefetching, the prefetch unit issues a prefetch address corresponding to the PFPA address, and then increments the PFPA address and the PFPA address. For each incrementation of the PFLA address, the limit checking logic compares the CSLA address with the PFLA address to determine if the CSLA address is within the prefetch block designated by such prefetch address,—if so, the limit checking logic sets a segment limit violation state including the location of the segment limit within the prefetch block.

When a COF hits in the BTC, the BTC outputs corresponding target address information used to generate a prefetch address for a corresponding target prefetch block. The limit checking logic compares at least a portion of the CSLA address to at least a portion of the target address information to detect a potential segment limit violation indicating that the CSLA address is potentially within such target prefetch block.

If a potential segment limit violation is detected, the limit checking logic asserts a potential segment limit violation state, including a potential segment limit location, that inhibits the transfer to the decoder of any instruction bytes in the target prefetch block beyond the potential segment limit. The limit checking logic compares at least the portion of the target linear address (from the address calculation stage) that was not used in detecting the potential segment limit violation with the corresponding portion of the CSLA. address, and if they do not match, the potential segment limit violation state is deasserted.

In another aspect of the invention, the target information supplied by the BTC comprises the low order part of the LA and no part of the high order part.

Embodiments of the invention may be implemented to realize one or more of the following technical advantages. The invention may be used in a pipelined Processor with a Prefetch unit, Branch unit, and LDST (load/store) unit.

The Prefetch unit implements a method of detecting segment limit violations where the Branch unit supplies COF target information for prefetching the target prefetch block, but does not supply the target linear address. The prefetch unit compares the segment limit linear address with the low order portion of the target address (which is the same for both the linear and physical address) supplied by the Branch unit—a match is detected as a potential segment limit violation which prevents instruction bytes in the prefetch block from being transferred from the prefetch buffer to the Decoder. When the COF target linear address is calculated in the AC stage of the execution pipeline, the rest of the target linear address is compared with the segment limit linear address to confirm whether the prefetch block actually contains the segment limit. The method of detecting and then confirming potential segment limit violations for prefetch requests initiated by the Branch unit supports pipeline performance while avoiding having to include in the Branch unit the target linear address, or having to include in the Prefetch unit translation logic for translating linear addresses supplied by the Branch unit, thereby reducing complexity and increasing manufacturability, with attendant advantages for overall computer system cost.

The Prefetch unit includes a three-block prefetch buffer and uses virtual buffer management to logically allocate the physical buffer blocks as holding current, next, and previous prefetch blocks. For sequential decoding, virtual buffer management is used to operate the prefetch buffer as a circular queue. For branches, the logical previous buffer block can be assigned to store either a target prefetch block or a prefetch block including the not-predicted path of the branch, while the logical current and next buffer blocks are able to continue operation as a circular queue. The virtual buffer management scheme increases performance of the Prefetch unit in delivering instruction bytes to a decoder, and thereby increase instruction throughput and overall computer system performance.

The Branch unit includes a branch target cache (BTC) that, for each COF entry, stores as target information sufficient to identify a cache location, for example, the L1 Cache index and way number, instead of the full target address (including the tag address used for tag comparison with the address of the prefetch block stored at that location. For a BTC hit, the exemplary L1 Cache is accessed with the L1 Cache index for set selection, with the way number being used to select a particular cache location in the set—the L1 Cache returns the prefetch block (cache line) at that cache location along with the associated tag address. Caching the L1 Cache index and way number (of other cache location identification information) represents a significant reduction in the number of bits stored in the BTC, thereby reducing die area required for the BTC, and allowing a reduction in overall die area or an increased allocation of die area to other processor modules, with an attendant decrease in computer system cost or increase in computer system performance.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DRAWINGS

Figure 6A:
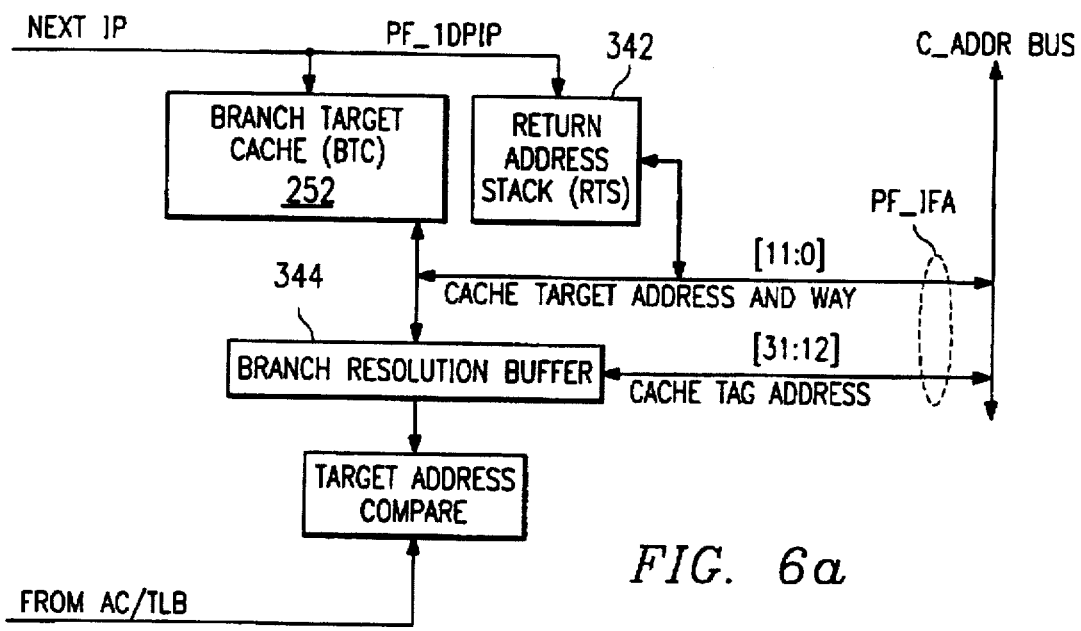
FIG. 6a illustrates an exemplary branch unit including branch target cache, return stack, and branch resolution buffer.
Figure 6B:
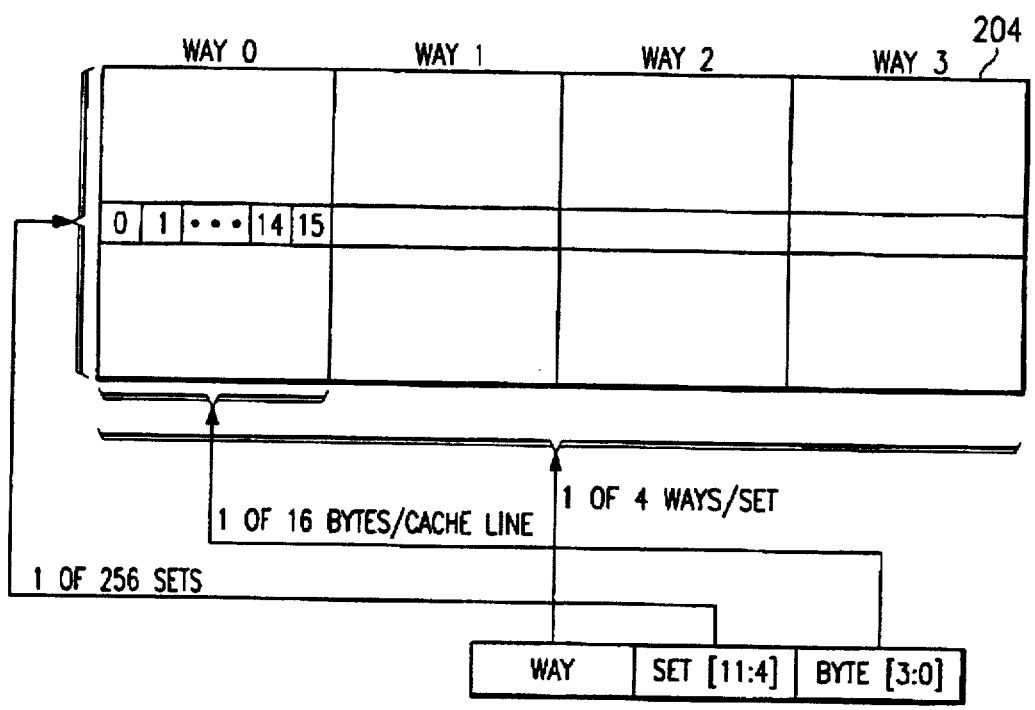
FIG. 6b illustrates the organization of an exemplary branch target cache as 4-way set associative.
Figure 6C:
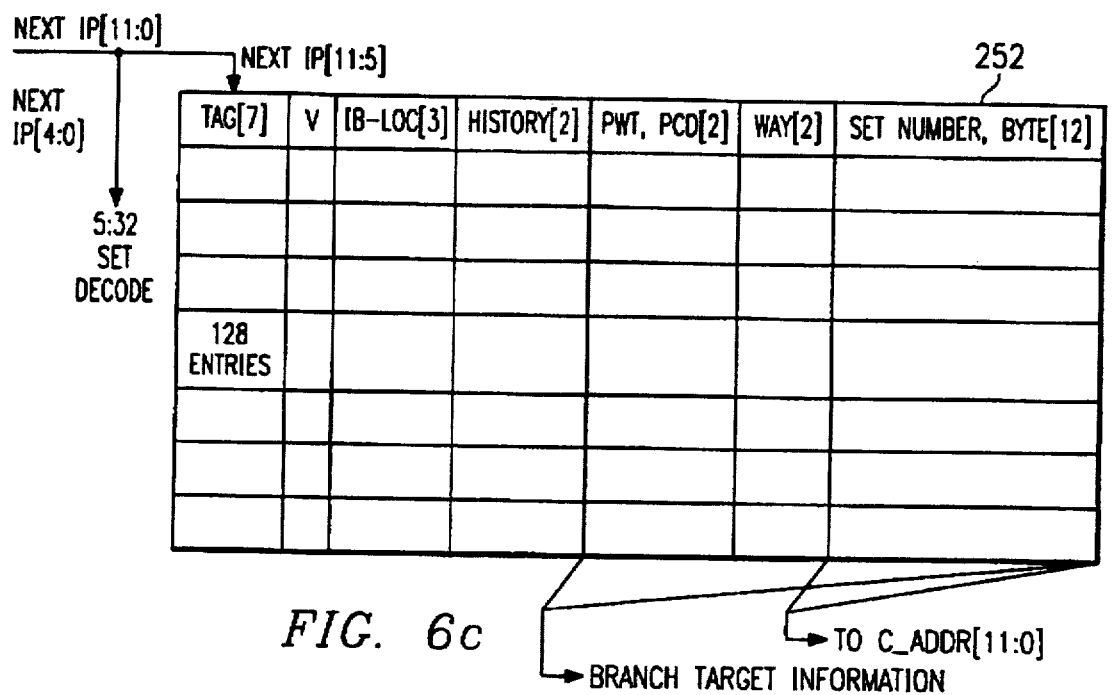

FIG. 6c illustrates exemplary COF entries in the branch target cache including for each entry the L1 cache index (set number), byte location number, and way number for the cache line containing the target instruction in the L1 cache, together with an IB_LOC field that when valid indicates the location within the prefetch buffer of a target for a short COF, and two history bits used in predicting the direction of conditional COFs.

Figure 7:
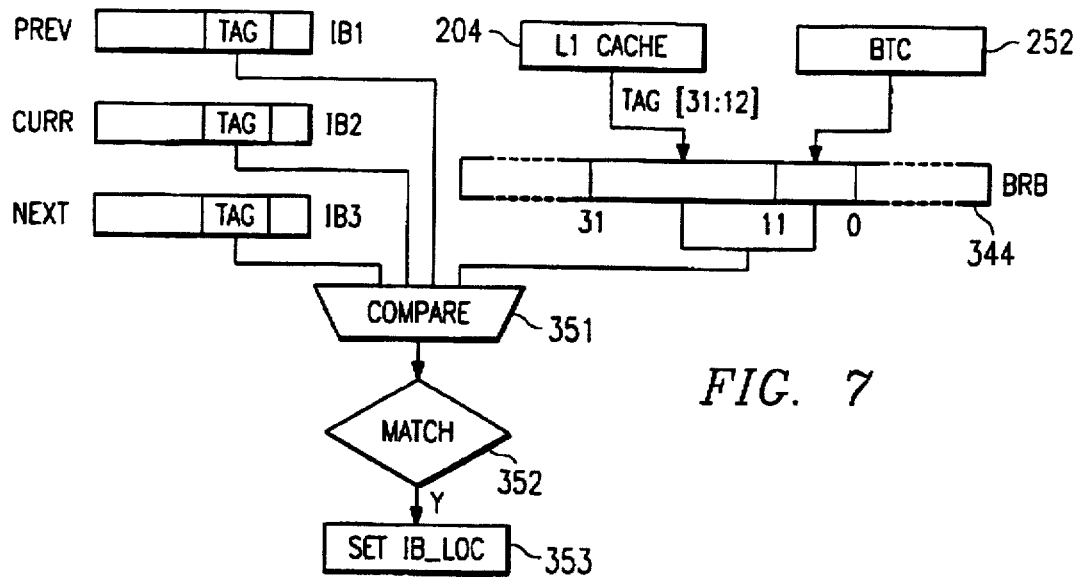

FIG. 7 illustrates the detection of short COF conditions, including setting the IB_LOC field in the branch target cache.

Figure 8A:
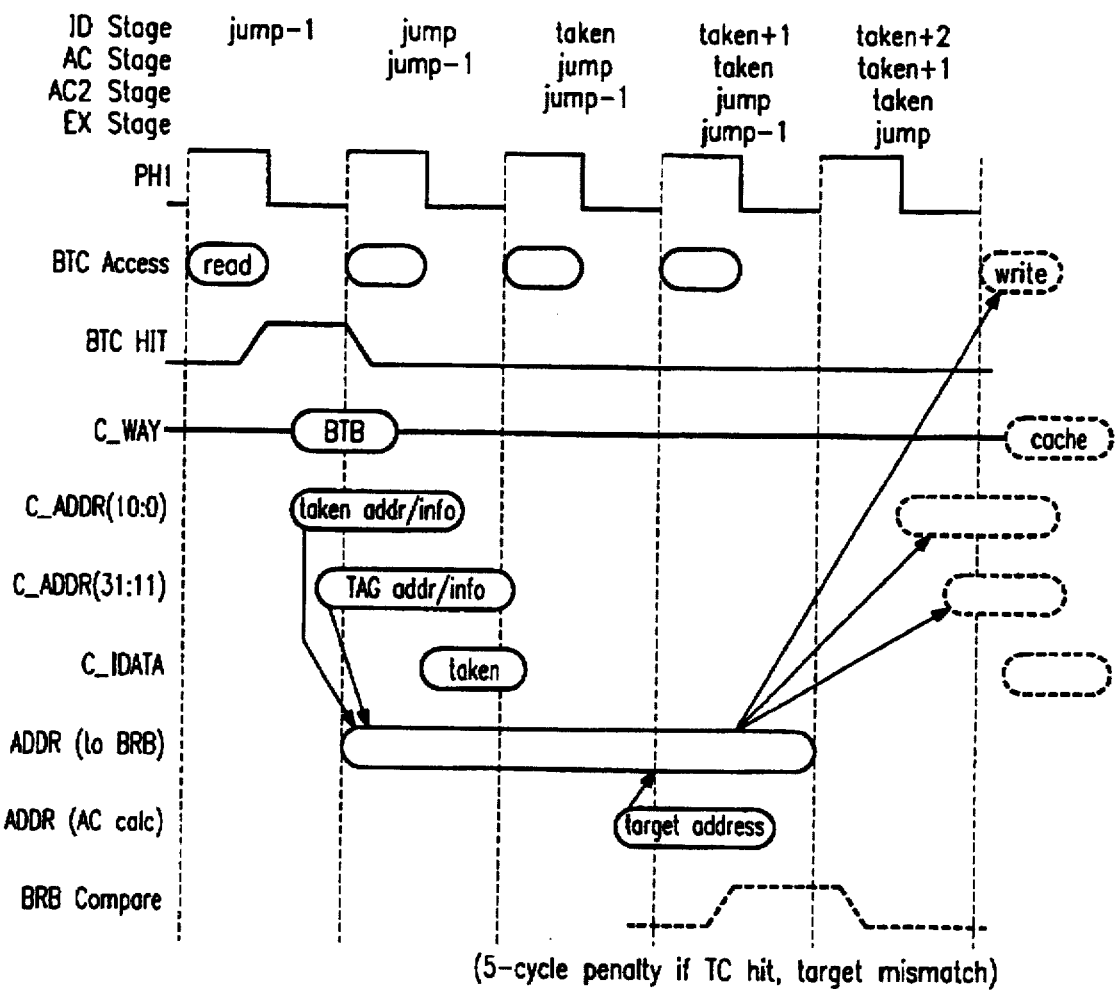
Figure 8B:
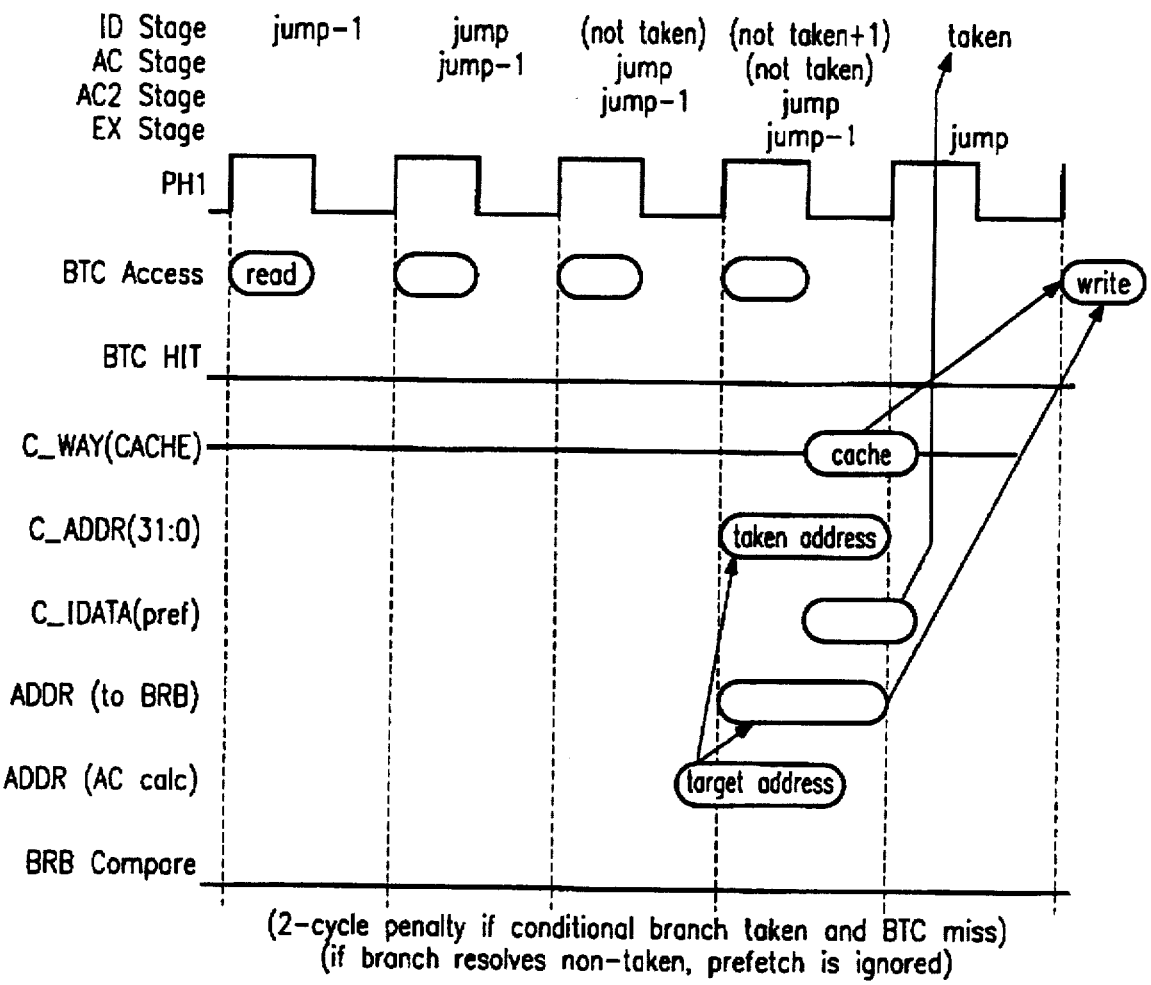

FIGS. 8a and 8b illustrate timing diagrams respectively for reading and writing the branch target cache.

Figure 9:
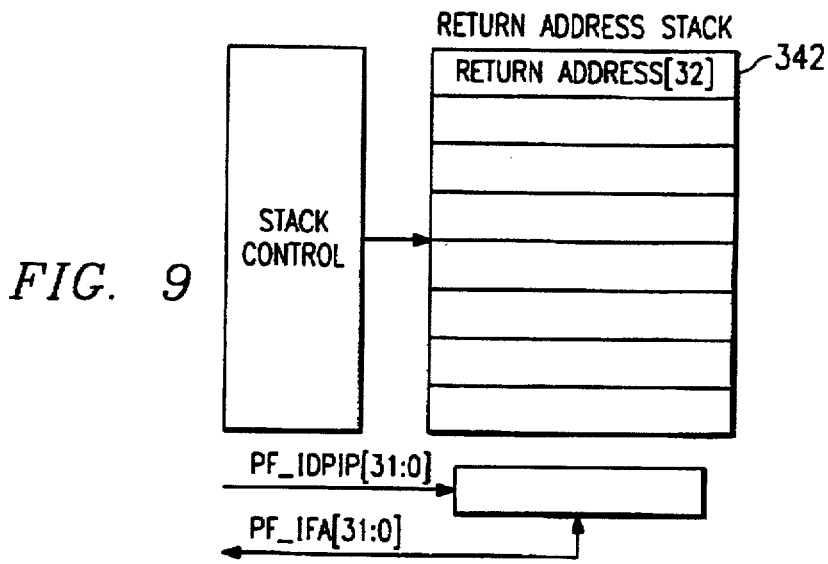

FIG. 9 illustrates an exemplary return stack organization.

Figure 10:
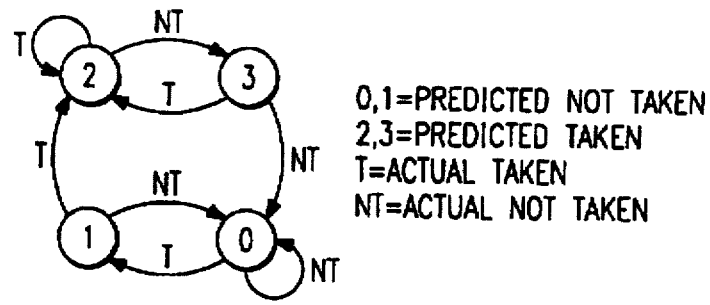

FIG. 10 illustrates the two bit prediction algorithm for conditional COFs.

Figure 11:
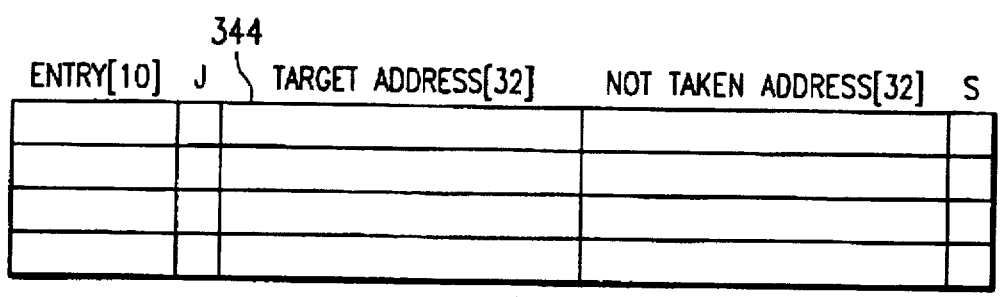

FIG. 11 illustrates the organization of an exemplary branch resolution buffer.

Figure 12A:
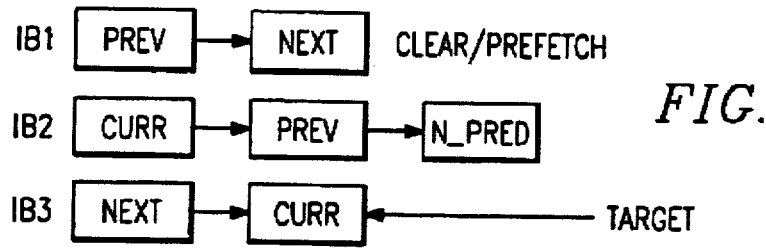
Figure 12B:
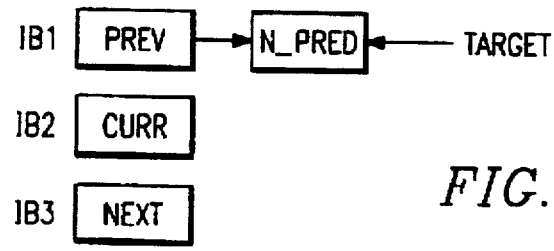
Figure 12C:
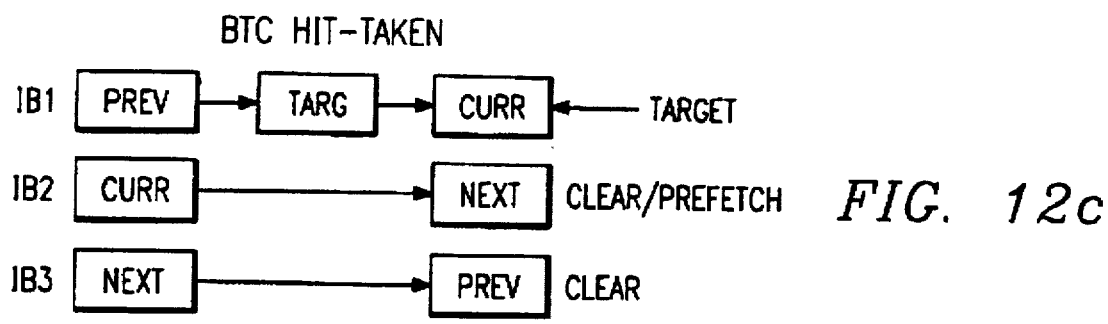

FIGS. 12a, 12b and 12c illustrates the exemplary virtual buffer management scheme using CURR/NEXT/PREV logical buffer allocations along with temporary TARG and N_PRED tag assignments respectively for (a) COFs that miss in the branch target cache and are statically predicted taken, (b) COFs that miss in the branch target cache and are statically predicted not-taken, and (c) COFs that hit in the branch target cache and are predicted taken.

Figure 13:
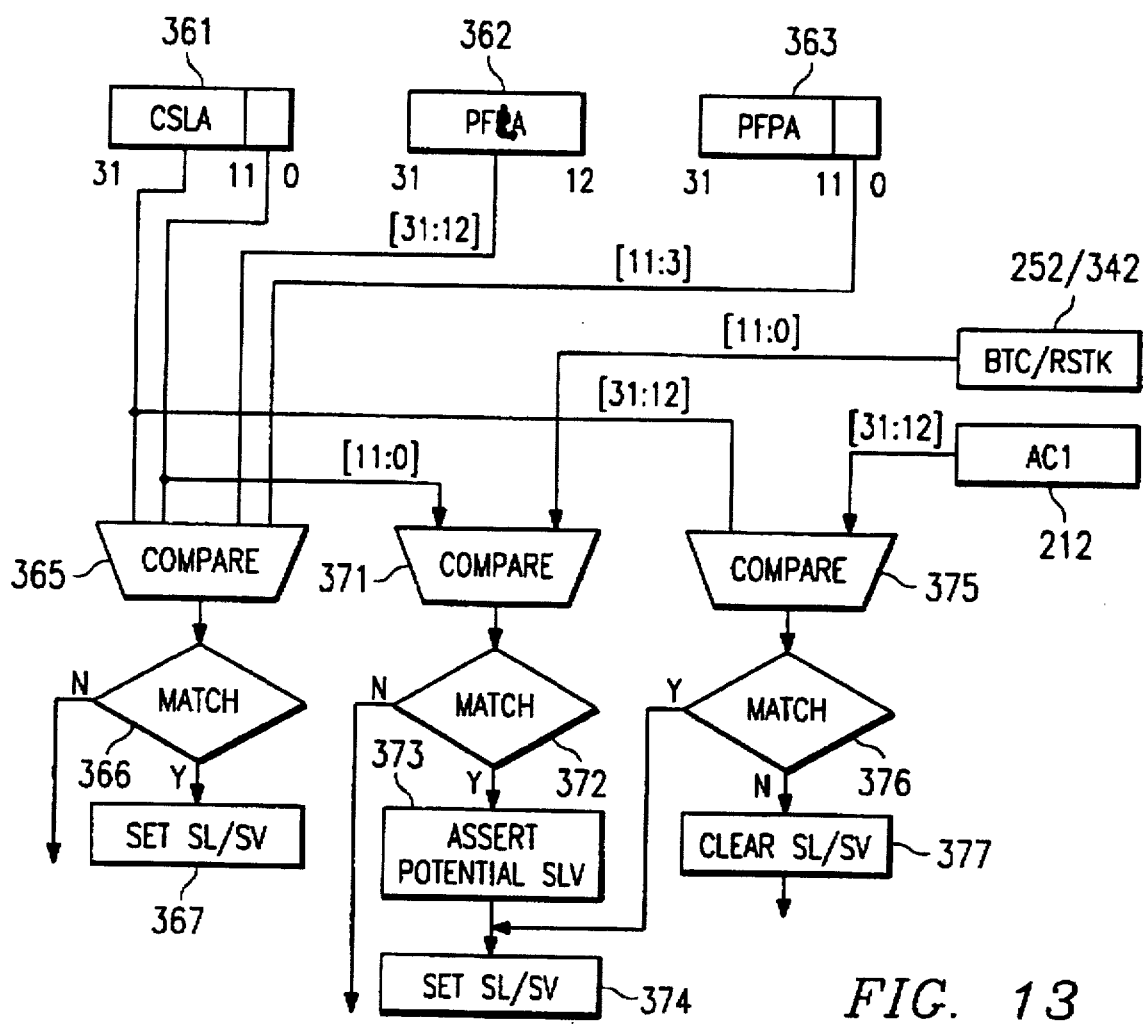

FIG. 13 illustrates the exemplary scheme for detecting segment limit violations in the case of COFs that hit in the branch unit.

Figure 14A:
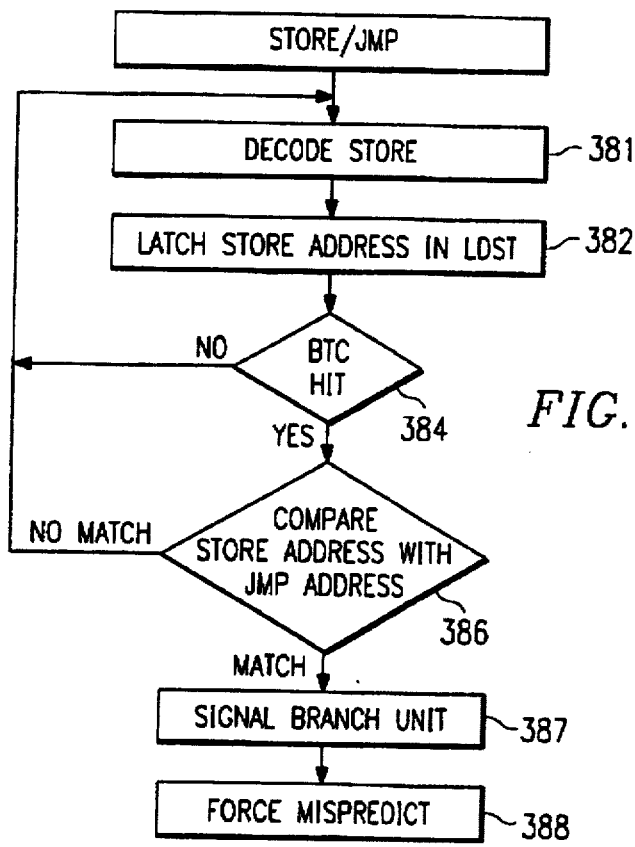
Figure 14C:
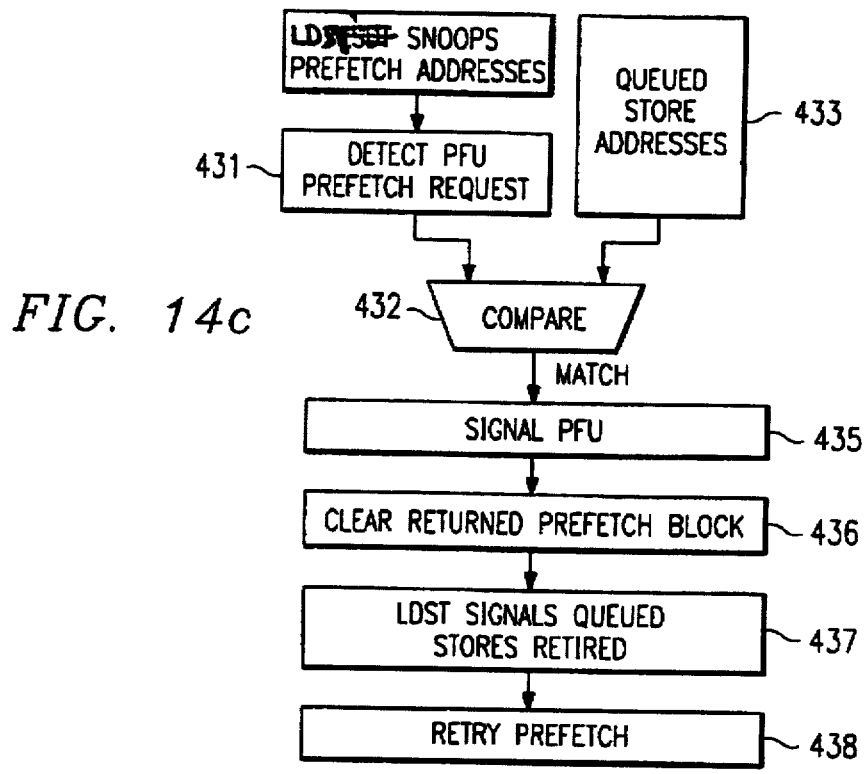
Figure 14B:
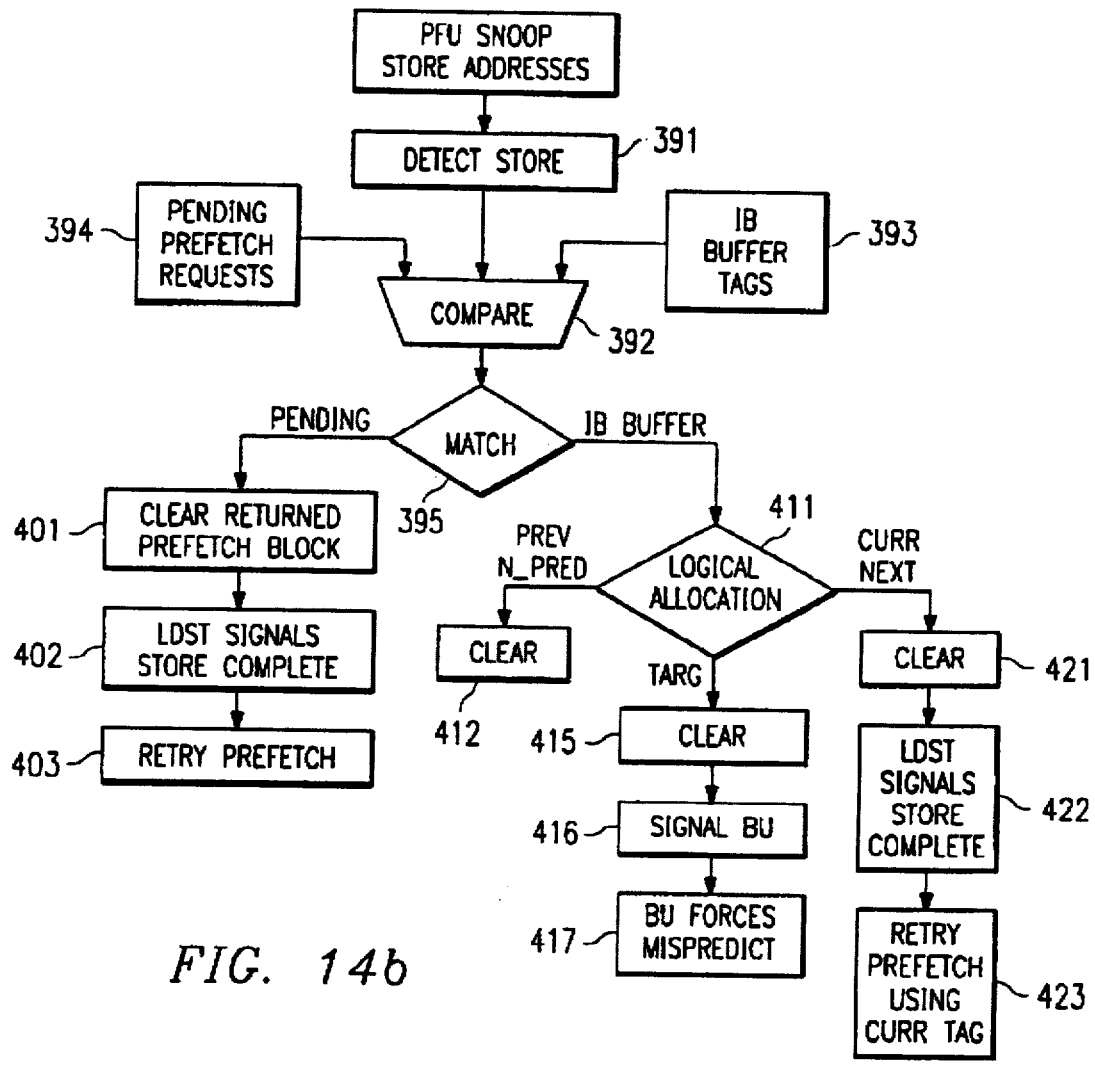

FIGS. 14a, 14b and 14c illustrate the exemplary scheme for detecting self-modifying code using respectively (a) an implementation of the 486 jump/store specification for JMPs that hit in the BTC, (b) Prefetch unit snooping of store addresses for comparison with pending prefetch requests and prefetch blocks already in the prefetch buffer blocks, and (c) LDST unit snooping of prefetch requests for comparison with stores queued in the LDST store reservation stations.

DETAILED DESCRIPTION

The detailed description of an exemplary embodiment of the scheme for detecting segment limit violations for branch targets when the branch unit does not supply the linear address is organized as follows:

1. Computer System
  1.1. System
  1.2. Processor
2. Prefetch Unit
  2.1. Prefetch Buffer
  2.2. Buffer Control
  2.3. Prefetch Addressing
    2.3.1. Sequential Prefetching
    2.3.2. COFs
3. Branch Unit
  3.1. Target information
    3.1.1. Storing Cache Indices
    3.1.2 Short COFs
  3.2. BTC Access
    3.2.1. BTC Miss
    3.2.2. BTC Write
  3.3. Return Stack
  3.4. Branch Prediction
  3.5. Resolution
4. Virtual Buffer Management
  4.1. Sequential Prefetch
  4.2. Normal COF
    4.2.1. BTC Miss
    4.2.2. BTC Hit
    4.2.3. Return Stack
  4.3. Short COF
  4.4. Not-Predicted Path
  4.5. Mispredicted Branch
5. Limit Checking
  5.1. Segment Limit Checking
  5.2. Page Limit Checking
6. Detecting Self-Modifying Code
7. Conclusion This organizational outline, and the corresponding headings, are used in this Detailed Description for convenience of reference only.

The exemplary prefetch/branch unit organization is used to support prefetching and branch processing (including branch prediction) in a 586 generation processor. Detailed descriptions of conventional or known aspects of processor systems are omitted so as to not obscure the description of the invention. In particular, terminology specific to the x86 processor architecture (such as register names, signal nomenclature, addressing modes, pinout definition, etc.) is known to practitioners in the processor field, as is the basic design and operation of such processors and of computer systems based on them.

When used with a signal, the # symbol designates a signal that is active low, while the/symbol designates the complement of a signal.

1. Computer System

Figure 1:
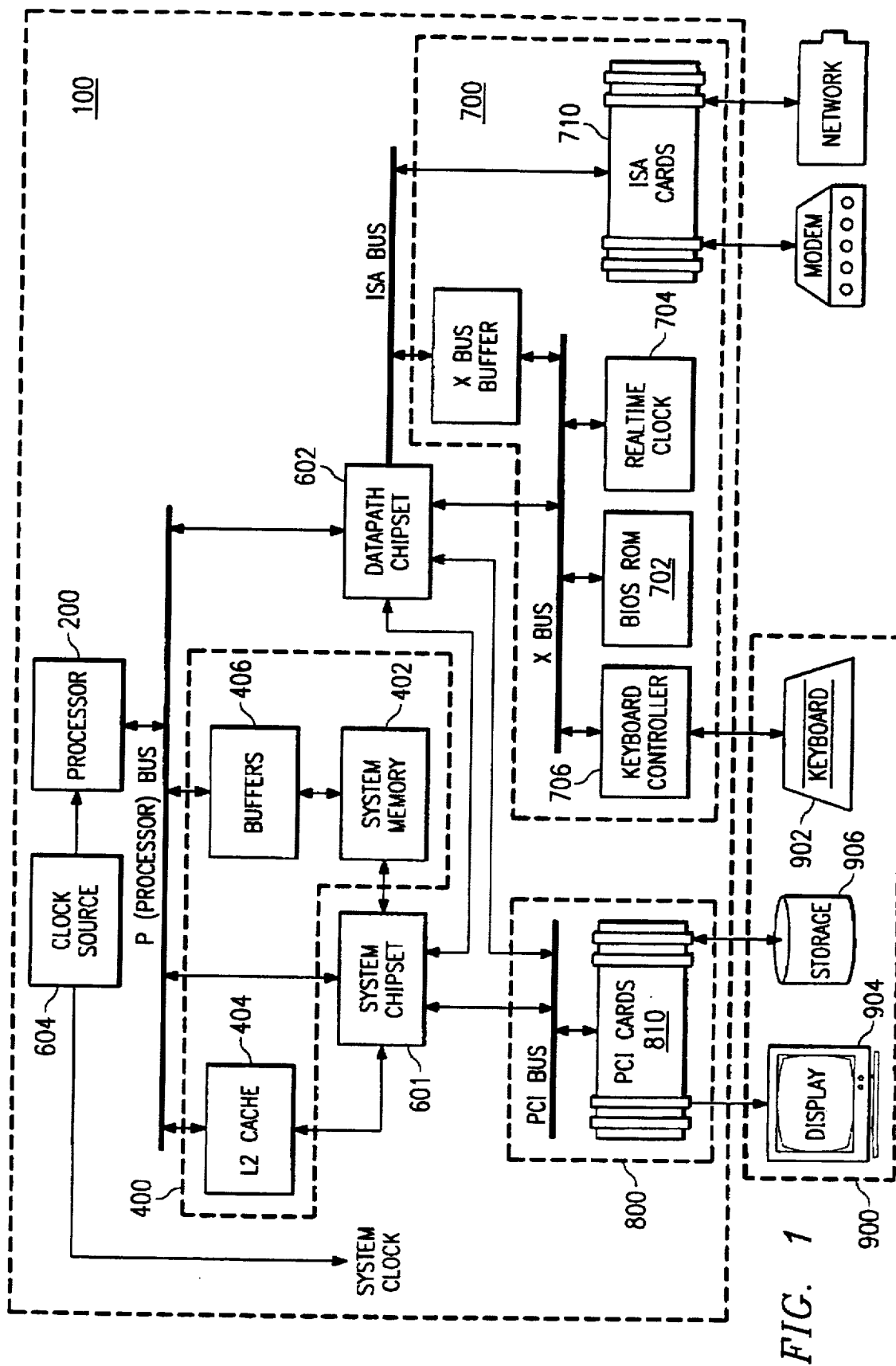
FIG. 1 illustrates an exemplary computer system including a processor and memory subsystem intercoupled over a processor bus, together with peripheral bus interface.

FIG. 1 illustrates an exemplary computer system, including a system or motherboard 100 with a Processor 200, memory subsystem 400, and system logic including system chipset 601 and datapath chipset 602.

Figure 2A:
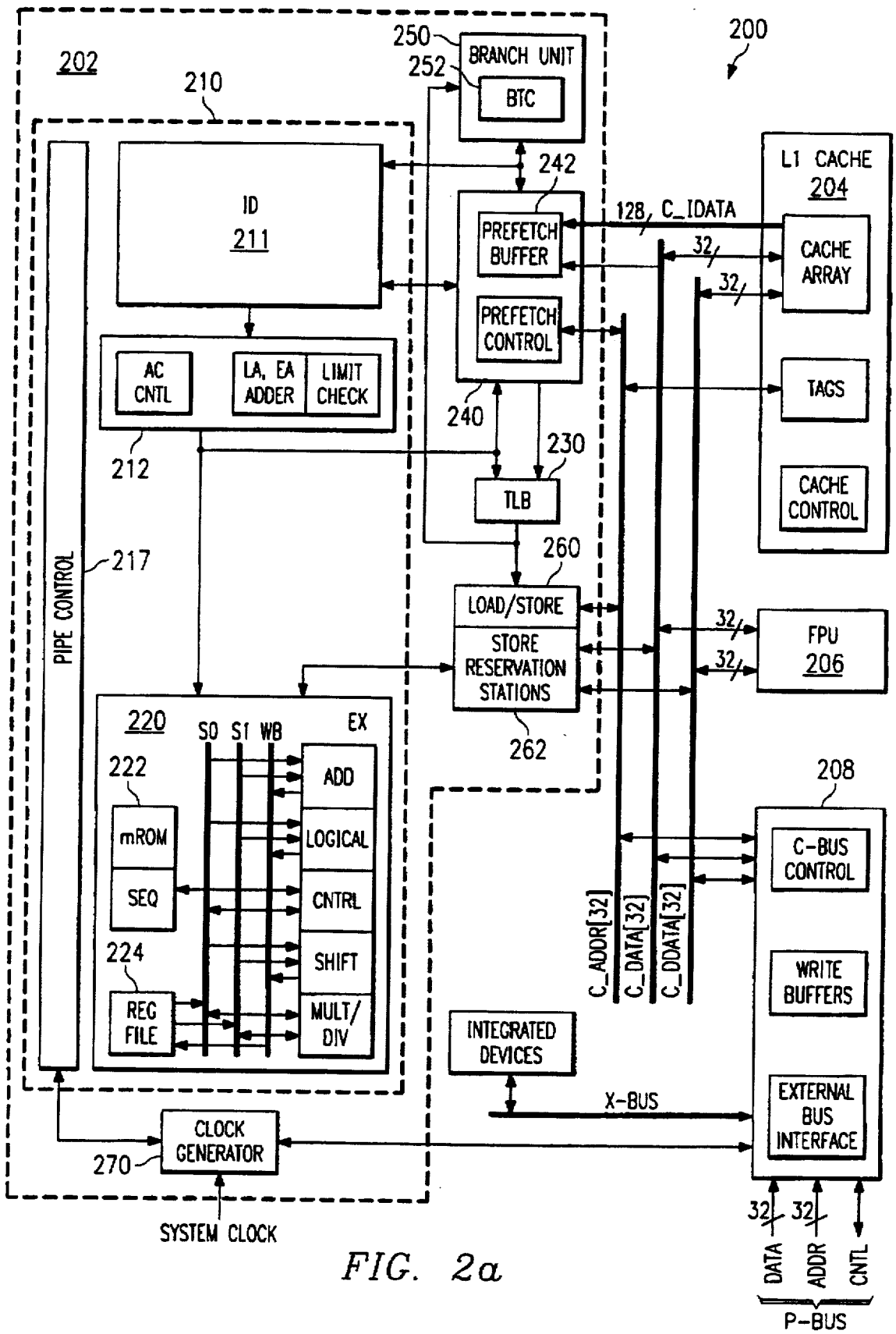
FIGS. 2a and 2b illustrate an exemplary processor including a prefetch unit and branch unit.
Figure 2B:
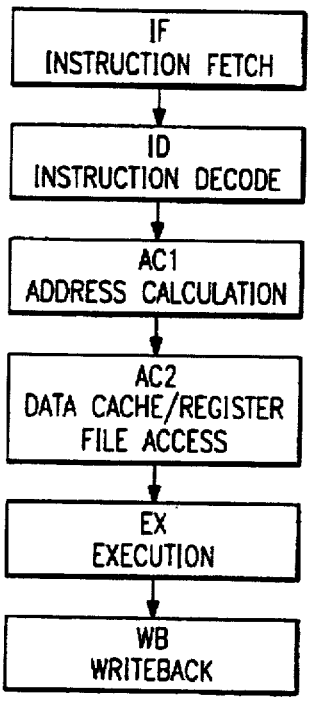

FIGS. 2a and 2b illustrate the exemplary x86 Processor 200.

1.1. System

Referring to FIG. 1, motherboard 100 includes the Processor 200 interfaced to the memory subsystem 400 over a P-BUS (sometimes referred to as a CPU or local bus). The system logic includes, in addition to the system chipset 601 and datapath chipset 602, an external clock source 604 (which provides an external clock input to the Processor and system clock signals to the rest of the motherboard).

For the exemplary computer system, the P-BUS is a conventional 486-type 32-bit address and data bus.

For the exemplary computer system, the only system elements that reside on the P-Bus are the Processor 200, memory subsystem 400, and the system and dampath chipsets 601 and 602. According to the exemplary division of system logic functions, the system chipset interfaces to a conventional 32-bit PCI peripheral bus, while the datapath chipset interfaces to a 16-bit ISA peripheral bus and an internal 8-bit X bus.

Some current systems allow for a special VL-bus direct interface to the P-BUS for video/graphics and other peripherals.

For 32-bit systems with a 32 bit P-BUS, some current system logic designs combine the system and datapath chipset functions into a single chipset. For 64-bit systems with a 64-bit P-BUS, the pin count required by the 64-bit data bus width currently necessitates that the system and datapath chipset functions be split as indicated in FIG. 1.

Processor 200 is coupled over the P-BUS to system DRAM (memory) 402 and L2(level 2) cache 404—data buffers 406 control P-BUS loading by the system DRAM. The system chipset 607 includes P-BUS, DRAM, and L2 cache control. The datapath chipset 602 interfaces to the conventional X bus. The X bus is an internal 8-bit bus that couples to the BIOS ROM 702 and the RTC (real time clock) 704. In addition, a conventional 8-bit keyboard controller 706 resides on the X-bus.

The system and datapath chipsets 601 and 602 provide interface control for the 16-bit ISA bus and the 32-bit PCI bus. The ISA bus maintains compatibility with industry standard peripherals, coupling to ISA peripheral card slots 710. The PCI bus provides a higher performance peripheral interface for selected peripherals, including coupling to PCI peripheral card slots 810—in particular, a video/graphics card (including VRAM) 802 provides a video/graphics interface, while a storage controller 804 (which may be included as part of the system chipset) interfaces to storage peripherals.

The motherboard 100 couples through the PCI, ISA, and X buses to external peripherals 900, such as keyboard 902, display 904, and mass storage 906. Network and modem interconnections are provided as ISA cards (but could be PCI cards).

1.2. Processor

Referring to FIG. 2a, exemplary Processor 200 is an x86 processor that uses a modular architecture in which pipelined CPU core 202, L1(level 1) Cache 204, FPU (floating point unit) 206, and Bus Controller 208 are interconnected over an arbitrated C-BUS. The CPU core interfaces to the C-BUS through Prefetch and Load/Store modules. The Bus Controller provides the interface to the external P-Bus.

Referring to FIG. 2b, the Processor uses a six stage instruction execution pipeline: Instruction Fetch IF, Instruction Decode ID, Address Calculation AC1/AC2, Execution EX, and Writeback WB. The superpipelined AC stage performs instruction operand access—register file access, and for memory reference instructions, cache access.

Referring to FIG. 2a, CPU core 202 includes an execution core 210 that encompasses the ID, AC, EX, and WB execution stages. A Prefetch Unit 240 performs Instruction Fetch in conjunction with a Branch Unit 250, prefetching instruction bytes for Instruction Decode. A Load/Store unit 260 performs operand loads and stores results for the AC, EX, and WB stages. A clock generator 270 receives the external system clock, and generates internal core and other clocks, including performing clock multiplication and implementing clock stopping mechanisms.

Execution core 210 includes a Decode unit (ID) 211, an AC unit 212, and an EX unit 215. A Pipe Control unit 217 controls the flow of instructions through pipe stages of the execution core, including stalls and pipe flushes.

The EX unit is microcode controlled by a microcontrol unit 222 (microsequencer and microrom) and a general register file 224. The EX unit performs add, logical, and shift functions, and includes a hardware multiplier/divider. Operands are transferred from the register file or Cache (memory) over two source buses S0 and S1, and execution results are written back to the register file or the Cache (memory) over a writeback bus WB.

Prefetch unit (PFU) 240 performs Instruction Fetch, fetching instruction bytes directly from the Cache 204, or from external memory through the Bus Controller 208— instruction bytes are transferred in 8 byte blocks to ID 211 for decoding. The PFU fetches prefetch blocks of 16 instruction bytes (cache line) into a three-block prefetch buffer 242.

A virtual buffer management scheme is used to allocate physical prefetch buffers organized as a circular queue.

Branch unit (BU) 250 supplies prefetch addresses for COF instructions—predicted-taken branches and unconditional changes of flow (UCOFs) (jumps and call/returns). The BU includes a branch target cache (BTC) 252 for branches and jumps/calls and a return stack RSTK (not shown) for returns—the BTC is accessed with the instruction pointer for the instruction prior to the COF, while the RSTK is controlled by signals from ID 211 when a call/return is decoded. For branches that miss in the BTC (which will then be statically predicted), the PFU will speculatively prefetch along the not-predicted path to enable prefetching to switch immediately in case the branch is mispredicted.

The Decode unit (ID) 211 performs Instruction Decode, decoding one x86 instruction per clock. ID receives 8 bytes of instruction data from prefetch buffer 242 each clock, returning a bytes-used signal to allow the prefetch buffer to increment for the next transfer.

Decoded instructions are dispatched to AC 212, which is superpipelined into AC1 and AC2 pipe stages, performing operand access for the EX stage of the execution pipeline. For memory references (reads or writes), the AC1 stage calculates one linear address per clock (address calculations involving four components require an additional clock), with limit checking being performed in AC2—if paging is enabled, the AC2 stage performs linear-to-physical address translation through a TLB (translation lookaside buffer) 230. Instruction operands are accessed during AC2—for non-memory references, the register file is accessed, and for memory references, the Cache 204 is accessed.

The Cache is virtually indexed and physically tagged such that set selection is performed with the linear (untranslated) address available in AC1, and tag comparison is performed with the physical (translated) address available early in AC2, allowing operand accesses that hit in the cache to be supplied by the end of AC2 (the same as a register access). For accesses that miss in the Cache, cache control logic initiates an external bus cycle through the Bus Controller 208 to load the operand.

After operand access, the AC unit issues integer instructions to the EX unit 220, and floating point instructions to the FPU 206. EX and the FPU perform the EX and WB stages of the execution pipeline.

EX 220 receives source operands over the two source buses S0/S1 (a) as immediate data passed along with the instruction from AC 212, (b) from the register file 224, and/or for memory references, (c) from the Cache 204 or external memory through the Load/Store unit. In particular, for memory references that require an external bus cycle, EX will stall until operand load is complete.

Execution results are written back in the WB stage either to the register file, or to the Cache (memory)—stores to the Cache (memory) are posted in store reservation stations in the Load/Store unit 260.

Load/Store (LDST) unit 260 performs operand loads and result stores for the AC/EX units—in addition, for branches that miss in the BTC, the LDST unit issues prefetch requests for the target. Loads have the highest priority, except in the case of branches that miss in the BTC where the prefetch request for the target is given priority. Four reservation station buffers 262 are used for posting stores—stores can be posted conditionally pending resolution of a branch, retiring only if the branch resolves correctly. Stores are queued in program order—operand loads initiated during AC2 may bypass pending stores.

The L1 (level one) Cache 204 is a 16K byte unified data/instruction cache, organized as 4 way set associative with 256 sets and 4 ways per set, with each way in each set constituting a location for a 16 byte (4 dword) cache line (i.e., 256×4 cache lines). The Cache can be operated in either write-through or write-back mode—to support a write-back coherency protocol, each cache line includes 4 dirty bits (one per dword).

Bus Controller (BC) 208 interfaces to the 32-bit address and data P-BUS, and to two internal buses—the C-BUS and an X-BUS. Alternatively, the BC can be modified to interface to an external 64-bit data P-BUS (such as the Pentium-type bus). The BC includes 8 write buffers for staging external writes cycle.

The C-BUS is an arbitrated bus that interconnects the execution core 210, Prefetch unit 240, LDST unit 260, Cache 204, FPU 206, and the BC 208—C-BUS control is in the BC. The C-BUS includes a 32 bit address bus C_ADDR, two 32-bit data buses C_DATA and C_DDATA, and a 128-bit (16 byte cache line) dedicated instruction bus. C_DATA and C_DDATA can be controlled to provide for 64 bit transfers to the FPU, and to support interfacing the Cache to a 64-bit external data bus. In general, for 32-bit data transfers, the C_DATA bus is used for loads coming from off-chip through the BC to the LDST unit, the Cache, and/or the Prefetch Unit, and the C_DDATA bus is used for stores into the Cache or external memory through the BC. For instruction fetch misses, instruction data is provided over the C_DATA bus to the Prefetch unit at the same time it is provided to the Cache.

The X-bus is an extension of the external bus interface that allows peripheral devices to be integrated on chip.

2. Prefetch Unit

Figure 3:
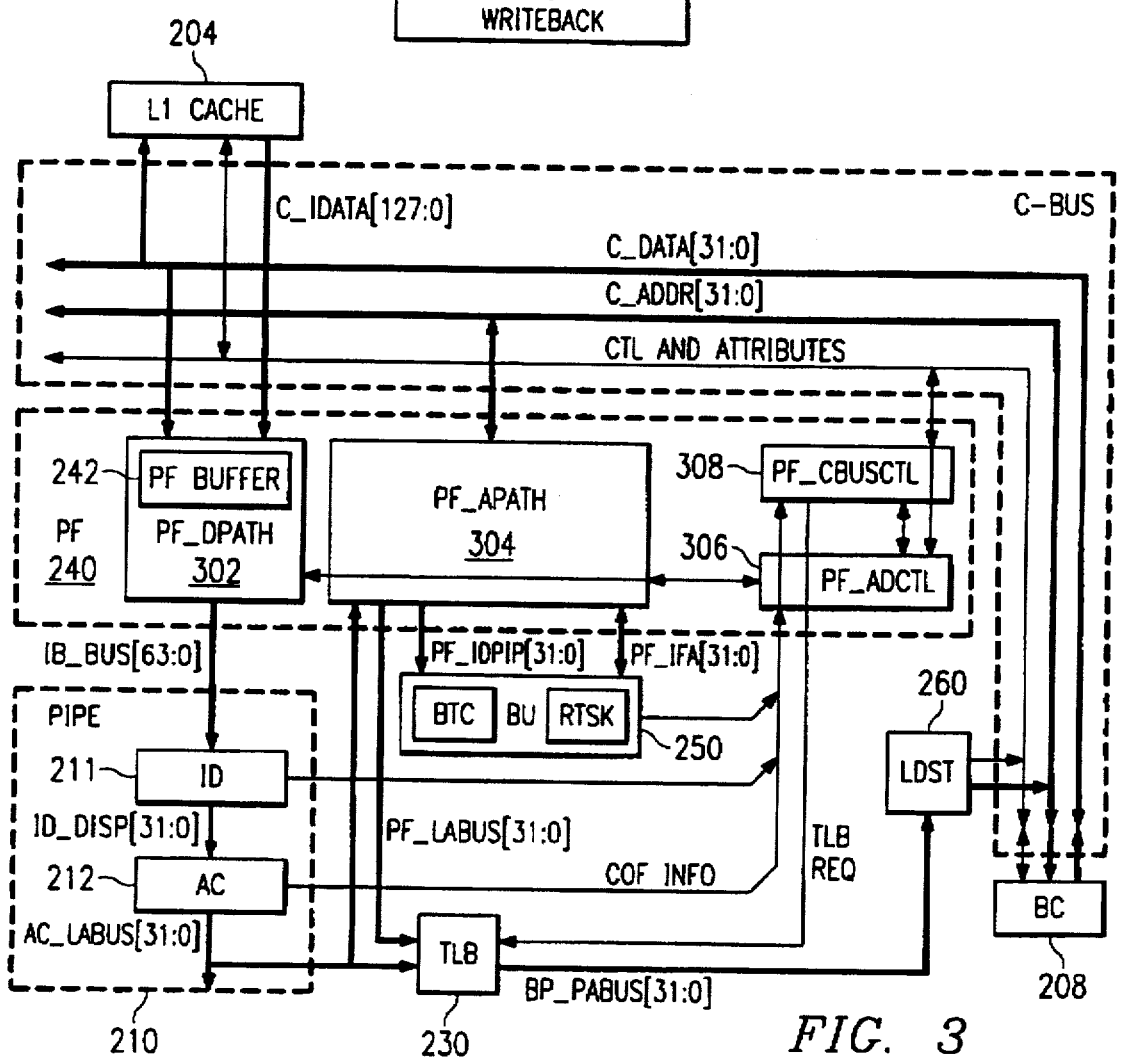
FIG. 3 illustrates an exemplary prefetch unit, including the principal dam, address, and control blocks, and the bus interconnections to the execution pipe, branch unit, load store unit, L1 cache, and bus controller.

FIG. 3 illustrates an exemplary Prefetch unit (PFU) 240 that implements the instruction fetch (IF) stage of the execution pipeline for the exemplary Processor described in Section 1.1 in connection with FIG. 2a. The PFU includes four principal blocks: two data path blocks pf_dpath 302 and pf_apath 304, and two control blocks pf_adctl 306 and pf_cbusctl 308. Pf_dpath 302 includes the multi-block prefetch buffer 242.

Dedicated buses interconnect the PFU to Branch unit (BU) 250, Decoder fiD) 211 and AC 212 (in execution core 210), Load/Store (LDST) 260, Cache 204, and Bus Controller (BC) 208. In particular, the PFU interfaces to the C-BUS for issuing prefetch addresses (C_ADDR) and receiving prefetch instruction bytes (either C_IDATA or C_DATA).

The two data path blocks pf_dpath 302 and pf_apath 304 are described in Sections 2.1 and 2.2. In general, pf_dpath 302 includes the 48-byte multi-block prefetch buffer 242, organized as three 16-byte (cache line) prefetch buffer blocks—a virtual buffer management scheme is used to allocate the three prefetch buffer blocks (see, Section 4). Pf_dpath supplies up to 8 instruction bytes to the decoder 211 each clock cycle—these bytes are shifted and aligned based on the instruction boundary of the last instruction decoded.

Pf_apath 304 generates prefetch requests over the C_ADDR bus, either by incrementing the last prefetch address (sequential prefetching), or by submitting a COF target address—(a) if the COF hits in BU 250, the BU will supply the target address to the PFU which will generate a prefetch request, or (b) if the COF misses, AC 212 will supply the target address to LDST 260 which will initiate a prefetch request. In response to a prefetch address, either the Cache 204 returns the corresponding prefetch block of 16 instruction bytes over the 128-bit dedicated instruction bus C_IDATA, or, if the cache request misses, BC 208 runs an external cache line fill cycle (4-dword burst cycle) and returns the instruction bytes over the 32-bit C_DATA bus (4 dword transfers).

The control block pf_adctl 306 basically handles the control functions associated with the pf_dpath and pf_apath datapath blocks. It receives control information from the C-BUS as well as ID 211, AC 212, and BU 250—this control information is converted to direct control of the multi-block prefetch buffer, as well as address manipulation functions in the two datapaths pf_dpath and pf_apath.

The control block pf_cbusctl 308 includes the majority of state information associated with the Prefetch unit, as well as the C-BUS interface control. Pf_cbusctl generates prefetch requests to the C-BUS, and controls the sequencing of these requests as they are satisfied. In particular, this control block tracks COFs down the execution pipe, using information from BU 250, ID 211, and AC 212.

PFU 240 and BU 250 cooperate to reduce the impact of COFs on the prefetch operation, including (a) for branches that miss in the BTC, buffering the not predicted path, and (b) for short COFs (including short LOOPs) for which the target is already in the prefetch buffer, switching to the target address without generating a prefetch request. For branches that miss in the BTC, the PFU allocates a prefetch buffer to both the predicted and not-predicted paths, allowing the PFU to immediately switch the code stream if the branch resolves mispredicted—branches that miss in the BTC are, (a) in the case of conditional jumps, predicted not-taken, and (b) in the case of LOOPs, predicted taken. For short COFs (forward or backward branches or UCOFs), the BTC stores information indicating that the target address is already in one of the prefetch buffers, and available for transfer to ID 211, obviating a prefetch operation to retrieve the target.

For the exemplary embodiment, COFs are indexed in BU 250 with the instruction pointer for the instruction prior to the COF to allow the prefetch request resulting from a BTC hit to be generated early enough to prefetch the target cache line in time for the target instruction bytes to be ready for transfer to the Decoder without any branch delay penalty.

In addition, PFU 240 includes mechanisms (a) to ensure that a segment boundary is not crossed when BU 250 supplies the prefetch target address (see, Section 5), and (b) to detect self-modifying code that does not conform to the 486 self-modifying code specification (see, Section 6).

2.1. Prefetch Buffer

Figure 4A:
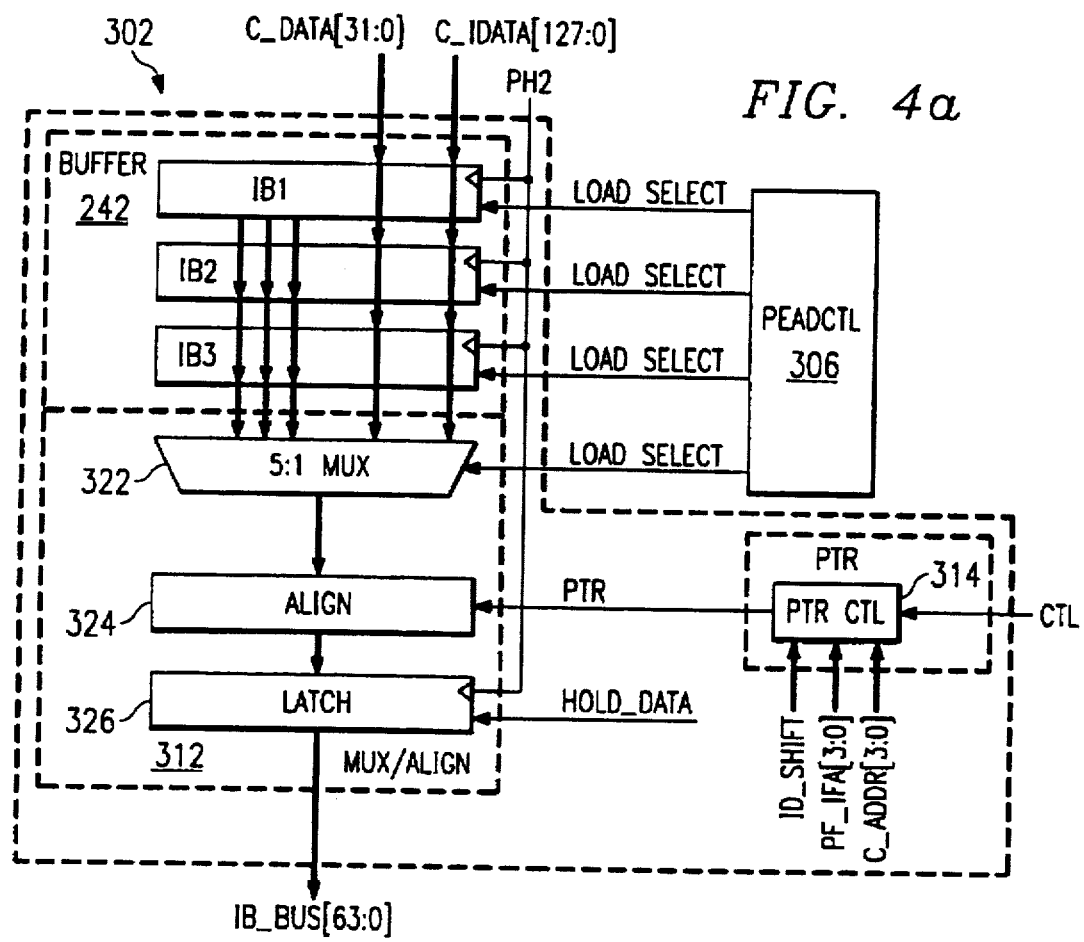
FIG. 4a illustrates an exemplary prefetch buffer organization, including a three-block prefetch buffer and associated multiplexing/alignment logic and control logic.

FIG. 4a illustrates the exemplary prefetch buffer organization of the pf_dpath block 302, which includes three-block prefetch buffer 242, mux/align logic 312, and byte pointer control logic 314 in the pf_dpath block 302. Mux/align logic 312 includes a 5:1 multiplexer 316, and an aligner 317—the aligner is controlled by pointer control 314, which is responsive to a bytes-used shift signal id_shift from the decoder (ID 211 in FIG. 3) to shift the pointer to a new initial instruction byte for the next 8 byte transfer. Thus, unless the prefetcher is stalled, in each clock, up to 8 instruction bytes are staged in latch 318 for transfer to the decoder.

The prefetch buffer 242 includes three buffers IB0, IB1, and IB2, each staging a 16-byte (cache line) block of instruction bytes. That is, in each IB buffer, the instruction bytes are cache aligned on 16-byte boundaries, with each prefetch request generated by the PFU or the LDST unit returning a 16-byte block of instruction bytes that is routed to a selected one of the IB prefetch buffers.

Figure 4B:
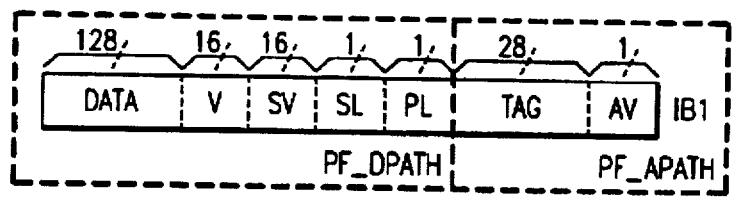
FIG. 4b illustrates the fields for an exemplary prefetch buffer block.

FIG. 4b illustrates the fields for each of the IB prefetch buffers—portions of a buffer are physically located in either the pf_dpath or pf_apath blocks of the PFU. In the pf_dpath block (302 in FIGS. 3 and 4a), aside from the data block of 16 instruction bytes (128 bits), each instruction byte has associated with it valid (V) and segment-valid (SV) bits (16 bits per field to allow one-hot interrogation). The valid bits indicate the validity of the data. The segment-valid bits are used to delineate the exact location of a segment boundary within the 16-byte block—if cleared for a given byte, that byte and the following bytes of the block are past the boundary and therefore invalid. In addition, a segment-limit (SL) bit and a page-limit (PL) bit indicate that a segment boundary or page boundary is present within that buffer block (page-valid bits are not needed because page boundaries are always aligned with block boundaries).

Two other prefetch buffer fields reside in the pf_apath block (304 in FIGS. 3 and 4a) and an prefetch address tag and associated valid bit AV. Each IB buffer includes a 28-bit prefetch address tag representing the memory-aligned physical prefetch address that fetched the prefetch block into the buffer—these bits are bits [31:4] of the 32-bit prefetch address (bits [3:0] are not used in identifying the 16-byte cache line). For each prefetch address request issued over the C ADDR bus, the pf_apath block maintains a copy in a register (not shown)—the prefetch address tag field is loaded from this register into the appropriate IB buffer when the prefetch block returns (AV is then set to indicate that the address tag is valid).

FIGS. 5a–5d illustrate, for the multi-block prefetch buffer 242, the juxtaposition of COFs and related variable length x86 instructions stored in the IB buffers IB1–IB3. As a preceding instruction N-1 is decoding, the BTC will be accessed and, if the access hits, the corresponding target address for the COF will be fetched, or in the case of short COFs, identified as already in one of the IB buffers, thereby enabling the code stream to switch to the target direction in the clock after the COF instruction decodes (assuming that, if a fetch is required, it hits in the Cache). Thus, the target instruction will follow the COF instruction into the execution pipeline without introducing a bubble (i.e., without stalling the decoder).

Figures 5A, 5B:
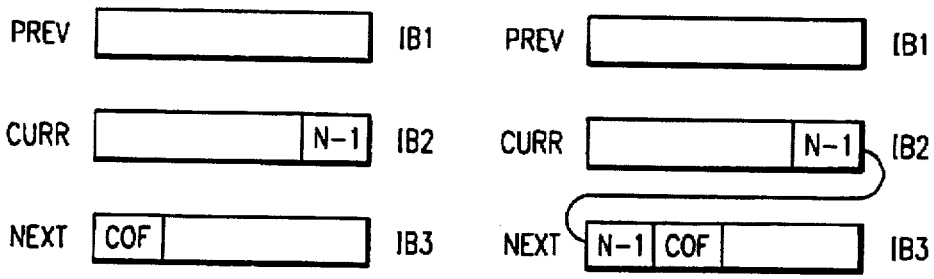
FIGS. 5a, 5b and 5c illustrate the placement of COF instructions within prefetch buffers logically allocated as PREV, CURR and NEXT.
Figure 5C:
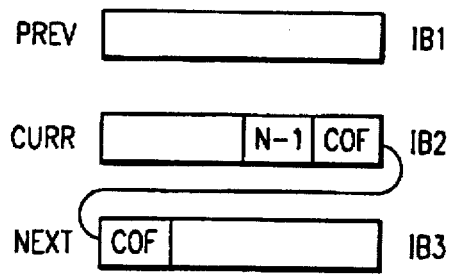

FIGS. 5a–5c illustrate situations in which two prefetch blocks, and therefore two IB buffers, are required to obtain both the indexing instruction N-1 and the COF. In FIG. 5a, the indexing instruction N-1 is located at the end of the current IB buffer IB2 and an associated COF is located at the beginning of the next prefetch block residing in IB buffer IB3. In FIG. 5b, the indexing instruction N-1 is misaligned in that it straddles two prefetch blocks IB2 and IB3. In FIG. 5c, the COF is misaligned.

Figure 5D:
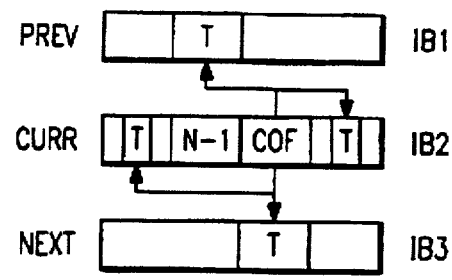
FIG. 5d illustrates short COF conditions where a COF instruction and its associated target instruction reside in the prefetch buffers at the same time such that a prefetch block of instruction bytes containing the target instruction need not be prefetched.

FIG. 5d illustrates short COF conditions. Both the indexing instruction N-1 and the COF reside in the current prefetch block in IB buffer IB2. For a short COF, the target of the COF resides in any one of the IB buffers IB1–IB3, either forward or backward relative to the COF.

2.2. Buffer Control

Referring to FIGS. 3 and 4a, the IB prefetch buffer 242 is controlled by the pf_dpath and pf_adctl blocks 302 and 306: (a) pf_adctl 306 controls buffer loading during prefetch operations, and buffer unloading for decode operations, implementing a virtual buffer management scheme as described in Section 4, while (b) pf_dpath 302, and in particular index pointer control logic 314, controls the mux/align logic 316 to select the appropriate 8 bytes for the next transfer to the Decoder.

Mux/align logic 316 receives instruction bytes from the three IB prefetch buffers IB1–IB3, and the two data buses C_IDATA and C_DATA, and multiplexes and aligns this data for delivery to ID 211 over an 8-byte ib_bus [63:0]. The initial stage of this logic is a 5:1 multiplexer 322 which selects the source of the instruction data to be transferred for decoding—source selection signals are provided by pf_adctl control 306 to select (a) one of the three IB prefetch buffers, (b) one of the two data buses, or (c) from a combination of these sources.

Aligner 324 aligns and selects the instruction bytes for the next 8 byte transfer to ID 211. Pointer control 314 outputs an index pointer to aligner 324 designating the index (initial) byte of the next 8 bytes of instruction data to be transferred. Thus, in the case of transfers from the IB prefetch buffers, pf_adctl control 306 determines which of the three prefetch buffers IB0, IB1, IB2 is current (based on the virtual buffer management scheme discussed in Section 4), and pointer control 314 indicates which byte within this prefetch block is the index byte.

An 8-byte latch 326 latches the 8 byte transfer, and holds the data valid on the ib_bus to ID 211. Valid bits for each byte lane are generated and delivered along with the instruction bytes.

When executing sequentially, for each 8 byte transfer, PFU 240 calculates the incrementation of the pointer value based on the number of bytes used in decoding the current instruction (1–8). The Decoder provides a bytes-used value via the id_shift lines to pointer control 314 to set up for the next 8 byte transfer.

If a COF is encountered, the target address is supplied to the PFU—and a pointer for the target address within an associated 16-byte prefetch block (cache line) are supplied to the PFU—the lower bits [3:0] of the target address constitute a pointer for the target address within a 16-byte prefetch block (i.e., identifying its location within the prefetched cache line). The target address is obtained from either (a) BU 250 over the pf_idpip bus, or if the BU access misses, (b) LDST 260 over C_ADDR (the target address is supplied to the LDST unit by AC 212). For short COFs that hit in the BU, the BU supplies an IB buffer tag identifying the IB buffer in which the target address is already located along with the pointer (see, Section 4.3).

If both the predicted and not-predicted paths of a branch are staged in the prefetch buffer 242 (as is the case for branches that miss in the BTC), index pointer control 314 maintains a pointer for each path.

Referring to FIGS. 4a and 4b, each clock the PFU 240 provides to the BU the physical IP (instruction pointer) for the initial instruction byte of the current 8 byte transfer, which is formed by the prefetch address tag for the current IB buffer (i.e., the current prefetch block) together with the 4-bit (one of 16) current initial byte pointer maintained by pointer control logic 314 in the pf_dpath block 302. When ID 211 completes decoding an instruction, it signals the Pipe Controller (217 in FIG. 2a) which in turn signals the BU—in response, the BU will latch the next IP from the PFU as the physical address for the initial byte of the next instruction to be decoded, and use this IP address for accessing the BTC and RSTK.

Referring to FIGS. 2 and 4a, the PFU IP address is supplied to BU 250 via the pf_idpip lines for BTC lookup.

Ira BTC hit occurs, the BTC supplies the prefetch address (see, Section 3.2).

2.3. Prefetch Addressing

Referring to FIGS. 3 and 4a, prefetch addresses can be generated by PFU 240 or LDST unit 260. The PFU generates prefetch addresses for sequential prefetching, and for COFs detected by BU 250 (BTC or RSTK hit). The LDST unit generates prefetch addresses for COFs that are not detected by the BU 250.

In response to a prefetch request, the prefetch buffer 242 can be loaded with data from two sources—the dedicated instruction bus C_IDATA [127:0] or C_DATA [31:0]. When a prefetch request hits in the Cache 204, it supplies the 16-byte cache line over the C_IDATA bus in a single 128-bit transfer. If the prefetch misses in the Cache, the bus controller runs an external cache line (burst) fill cycle, and returns the 16 instruction bytes (4 dwords) over the C_DATA bus to both the PFU and the Cache.

Data from two distinct prefetches can be loaded simultaneously into two of the three IB buffers as long as they return data over different buses. For branches, this feature allows both the predicted and not-predicted paths to be fetched and buffered simultaneously.

In the PFU, prefetching is controlled by the pf_apath and pf_adctl blocks 304 and 306. The pf_apath block 304 is basically a 32-bit datapath that (a) for sequential PFU prefetching, issues prefetch addresses over the C_ADDR bus to both the Cache 204 and Bus Controller 208, and (b) for prefetches initiated by LDST 260, receives addresses from that same bus to perform comparisons and update registers. Pf_apath ago (a) submits physical IP addresses for the instruction currently being decoded to BU 250 over the pf_if a bus for BTC lookup, and (b) for BTC/RSTK hits, receives prefetch target addresses/information back from the BU over the same bus.

Both the pf_if a and the C_ADDR buses transfer physical addresses. The pf_apath block 304 does maintain linear addresses for segment limit checking and other various functions—these linear addresses can be delivered to the TLB 225 via the pf_labus for translation, and can be updated from AC 212 via the ac_labus.

2.3.1. Sequential Prefetching

For sequential prefetching, pf_apath 304 performs five basic functions: (a) prefetch sequencing, (b) physical prefetch address request, (c) IB prefetch address tag comparison, (d) linear prefetch address maintenance, and (e) C_ADDR interface.

Pf_apath 304 generates prefetch requests by providing a physical address to C_ADDR, along with associated attributes. The pf_apath block drives prefetch addresses onto C_ADDR—control and attribute information is driven onto the C-BUS by the pf_adctl block 306.

Pf_apath 304 includes a physical prefetch request latch that holds the next physical prefetch address that will be placed on C_ADDR if no COFs are encountered in either the current or the next IB prefetch block. For sequential prefetching, an incrementer adds 16 to the contents of this latch each time a fetch is sent out. For a COF, the physical target address of the COF (from BU 250 or LDST 260) is mux-ed into the latch, and incremented in preparation for the next sequential prefetch.

Because it is possible for two instruction fetches to be simultaneously outstanding, pf_apath 304 includes a second prefetch request latch to hold the second outstanding prefetch addresses. Both latches are loaded from the pf_if a bus, or in the case of a prefetch request initiated by LDST 250, from the C-BUS (i.e., the PFU sequences instruction fetches issued from the LDST). The two latches are operated as a 2-deep queue.

Pf_apath 304 includes a retry latch to buffer the current prefetch address (from either the PFU or LDSI)—a retry signal may be received late, after the source of the prefetch address is already corrupted. The retry latch is updated either from pf_if a or from the C-BUS as a request is issued.

Pf_apath 304 is also responsible for signaling when a segment boundary has been reached by sequential prefetch, as well as when sequential prefetching encounters a page boundary (see, Section 5).

The pf_apath block also includes logic to detect self-modifying code (see, Section 6).

2.3.2. COFs

Referring to FIGS. 3 and 4a, the PFU 240 provides physical prefetch (IP) addresses to the BU 250 over the pf_idpip bus for BTC/RSTK lookup. The pf_apath block provides the physical IP for the instruction currently being decoded, i.e., the instruction for which the pf_dpath block 302 is currently delivering instruction bytes to ID 211.

For BTC hits, the BU 250 drives the target address directly onto the pf_if a bus,—the target address is gated by the pf_adctl block 306 onto the C_ADDR bus as a prefetch request unless a BTC hit results from a short COF (i.e., a COF in which the target has already been prefetched into the prefetch buffer 242) in which case no prefetch request is generated (see, Section 4.3). Target addresses supplied by the BU are latched in a target address latch in pf_apath 304—because the PFU begins prefetching at the target address as the instruction prior to the COF is decoding, it is possible that the current value in the physical prefetch address latch will have to be incremented for another prefetch to complete decoding such prior instruction and/or to fetch the COF instruction. Thus, in FIGS. 5a–5c, if the PFU IP for the index instruction N-1 in the current IB buffer IB2 results in a BTC hit such that the BU supplies the target prefetch address, the next prefetch block will nonetheless have to be fetched into IB buffer IB3 to complete decoding the instruction N-1 and/or to decode the COF. When the COF decodes, the target address (which has already been used either for prefetch or short COF detection) is incremented to the next memory aligned prefetch address and stored in the physical prefetch address latch in preparation for the next sequential prefetch request.

For COFs that miss in the BU, after the COF is decoded by ID 211, AC 212 calculates the target linear address which is input to the TLB 230—depending on whether paging is enabled, the TLB supplies a translated or untranslated target physical address to the LDST unit which generates a prefetch request. Recall that, for conditional COFs, the default prediction is (a) for branches, not taken, and (b) for LOOPs, taken—in either case, LDST 260 generates a prefetch request for the target address which for branches will be the not-predicted path, and for LOOPs will be the predicted path. The PFU will buffer the not-predicted path which, for branches, will be the taken path prefetched by the LDST unit, and for LOOPs, will be the not-taken fall through path (see, Section 4.4).

For prefetch addresses generated by LDST 260, AC 212 supplies the linear address to the LDST unit in AC1, which then initiate the prefetch request to the Cache—the linear address is used for set selection, with the translated physical address being available from TLB 230 early in AC2 for tag comparison and hit/miss determination. If the prefetch request hits, the Cache output will be placed on C_IDATA at the end of AC2 (i.e., on clock after the COF is decoded) —the pf_ifa bus is bypassed when LDST 250 generates the prefetch request.

If the BU 250 detects that a COF is mispredicted (either statically or dynamically), then the BU will drive the not-predicted address, which may be the taken or not-taken (fall-through) address, onto the pfa_ifa bus. For each COF, the BU stores both the predicted (statically or dynamically) and not-predicted addresses in a branch resolution buffer (see, Section 3.5).

3. Branch Unit

FIG. 6a illustrates the Branch Unit (BU) 250, which includes the branch target cache (BTC) 252, a return stack (RSTK) 342, and a branch resolution buffer (BRB) 344. The BU stores target information used for prefetching target addresses both (a) for conditional COFs (branches), i.e., JCC and LOOPs, and (b) for unconditional COFs (UCOFs), i.e., JMPs (jump) and CALLs/RETurns.

BTC 252 and RSTK 342 store target address information for recently used COFs. The BTC stores target address information for both conditional and unconditional COFs, except RETurns (see, Section 3.1). The RSTK 342 stores the physical target address for RETurn instructions (see, Section 3.3).

UCOFs are always taken (in effect, a static prediction). When a JMP or CALL that misses in the BTC is decoded, prefetching switches to the target direction, and an entry is allocated in the branch resolution buffer. The UCOF is written into the BTC if/when it reaches the EX stage. RETurns are handled by the RSTK.

For conditional COFs, the BU dynamically predicts the COF direction for BTC hits—COFs that miss in the BTC 252 are statically predicted. Regarding conditional COFs that miss in the BTC, LOOP instructions are statically predicted taken and prefetching switches to the target path (identified in the AC stage), while branches are statically predicted not-taken. In either case, LDST 260 commences prefetching in the taken direction once the target address is available from the AC stage—for LOOPs, the LDST unit prefetches the statically predicted taken direction (the PFU 240 either has or will prefetch one prefetch block along the not-predicted not-taken direction), while for branches, the LDST unit prefetches the statically not-predicted taken direction. If/when these instructions reach the EX stage, conditional COFs are allocated an entry in the BTC only if they resolve taken.

For conditional COFs that hit in the BTC 252, the predicted path depends on the history information stored along with the target information for that entry. Thus, once a conditional COF is allocated into the BTC, it will remain in the BTC until replaced even if its predicted path changes from the statically predicted path based on its history.

When a COF is detected, either by a BTC hit or by the Decoder for a BTC miss or a RETurn, an entry is allocated in BRB 344 (see, Section 3.5). In particular, for COFs predicted by the BU, the BRB 344 is used to resolve both the target address (available in the AC stage) and the target direction (available in the EX stage), and to repair any mispredictions.

Far COFs are never cached in the Branch unit (BTC or RSTK, because these require a segment load from memory.

3.1. Target Information

For the exemplary BTC, the target information used for prefetching target prefetch blocks containing target instructions is the L1 Cache index and way number that together define a particular cache location (containing a prefetch block cache line), rather than the actual target address (see, Section 3.1.1). In effect, the exemplary design assumes that the prefetch request issued in response to a BTC hit will hit in the L1 Cache.

FIG. 6b illustrates the organization of the cache array for the L1 Cache 204 (the tag array is similarly organized). The L1 Cache array is 16K 4-way set associative with 256 sets and 4 ways per set defining 256×4 set/way locations each storing a cache line of 16 bytes (4 dwords).

For prefetch addresses supplied by the PFU or LDST units (i.e., not the BTC), the L1 Cache is accessed with a prefetch address [31:4] (the lower bits are ignored. An 8 bit L1 Cache index [11:4] selects 1 of 256 sets with 4 ways (cache locations)—tag comparison using bits [31:12] of the physical (translated) address determines hit/miss, and for a hit selects 1 of 4 ways as the cache location output. The output cache line forms the prefetch block of instruction bytes returned to the Prefetch unit.

For PFU initiated prefetch requests, the PFU supplies the physical address [31:4] (L1 Cache index [11:4] and tag [31:12]) during IF. For LDST initiated prefetch requests, the LDST unit supplies the L1 Cache index bits [11:4] from the linear address available in AC1, and then supplies the tag bits [31:12] of the translated address available in AC2.

3.1.1. Storing Cache Indices

FIG. 6c illustrates the BTC 252, and in particular the BTC entries. Each BTC entry includes bits [11:0] of the target address comprising (a) a set number [11:4] formed by the L1 Cache Index, and (b) a byte location number [3:0]. The L1 cache index [11:4], together with a 2 bit way number, identify a particular cache location (set and way) assumed to store the prefetch block containing target instruction—the byte number identifies 1 of 16 bytes that is the initial target instruction byte.

Finally, each entry includes a valid bit, a three-bit IB_LOC field that designates the IB buffer location for short COFs, branch history bits, and two attribute bits PWT (page write through) and PCD (page cache disable).

In particular, the BTC stores only the L1 Cache index [11:4] portion of the target address, but not the corresponding cache tag [31:12] portion. A prefetch access with the L1 Cache index will enable set selection to be performed, but the cache tag will not be available for tag comparison to select the way in which the cache line containing the target instruction is stored—instead, the way number cached in the BTC along with the L1 Cache index is used for way selection, allowing the L1 Cache to return a cache line in response to the prefetch request. When the COF that resulted in the BTC hit is executed, the Branch unit will determine whether the prefetch request resulting from the BTC hit was successful in retrieving the target instruction (see, Section 3.2.1).

Storing L1 Cache indices in the BTC, rather than the full target address including the cache tags, has a number of advantages, including reducing BTC die area. Regarding die area, caching L1 Cache tags requires 14 bits—bits [11:0] plus the 2 bit way number—versus 32 bits for the full target address, for an area reduction of 18×128 bits.

Note that portion of the target address stored in the exemplary BTC is the low order 12 bits [11:0] that are the same for both the linear address and translated physical address. In other words, the BTC does not contain any portion of the upper 20 bits of either the linear or physical address, and in particular, does not supply the target linear address for use in segment limit checking (see, Section 5).

Each BTC entry has associated with it a 7 bit tag. The BTC is accessed with the PFU IP bits [11:0], with bits IP[4:0] selecting 1 of 32 entries from each of the 4 ways, and bits IP[11:5] providing the 7 bit tag that is compared to each selected entry to determine hit or miss.

Because the exemplary BTC organization uses a 5-bit index and a 7-bit tag, aliasing is possible between instructions with IPs that are identical for bits [12:0] but different in the upper 20 bits. Thus, a BTC hit may result from the IP for an instruction that aliases with an the IP for an instruction that is prior to a COF—a BTC non-COF alias will be detected when no COF is decoded. Allowing aliasing represents a design trade-off to reduce BTC.

3.1.2. Short COFs

The Prefetch unit and Branch unit cooperate to detect a short COF condition in which the target instruction is already in one of the three IB buffer blocks (see, FIG. 5c). By detecting a short COF, the Prefetch unit is able to switch to the target instruction without issuing a prefetch request for the prefetch block (cache line) containing the target.

FIG. 7 illustrates the detection of a short COF condition, including the setting of the IB_LOC field in a corresponding BTC entry. The IB_LOC field (FIG. 6c) is a 3 bit one-hot field that selects one of the three IB buffers according to the logical allocations CURR/NEXT/PREV (see, Section 4.3).

When a COF is first encountered, it misses in the BTC and is detected during decode. If the COF is resolved taken in the EX stage, an entry for the COF is allocated in the BTC. That entry includes the L1 Cache index for the target instruction but as yet the IB_LOC field is not valid.

The second time the COF is encountered, it hits in the BTC 252, which outputs target prefetch information (L1 Cache index and way number). In response to the prefetch request, the L1 Cache 204 returns the prefetch block containing the target (assuming a cache hit on a cache location containing the target), along with the corresponding cache tag.

The branch resolution buffer 344 receives the low order bits [11:0] of the target address from the BTC 252 (L1 Cache index and byte number), and the high order bits [31:12] of the target address from the L1 Cache 204 (cache tag address). The target address is compared (351) with the prefetch address tags for each of the IB buffers IB1–IB3. If a valid IB buffer prefetch address tag matches (352) the target address (indicating that the prefetch block containing the target is already in the designated IB buffers), then a short COF condition is detected.

When a short COF is detected, the logical corresponding BTC entry is updated (353) with the logical CURR/PREV/NEXT IB buffer location. When the COP is encountered the third time, the correct IB buffer is used to source target instruction, and a prefetch request is inhibited.

Note that, while the exemplary IB_LOC field designates the logical IB buffer CURR/NEXT/PREV containing the target, the Branch unit could supply merely an indication that the target is in the prefetch buffer, and the PFU could determine that which IB buffer contains the target.

Avoiding unnecessary prefetch requests has a number of advantages, including saving power and enhancing performance because the C-BUS and L1 Cache are not accessed for the target prefetch. In particular, eliminating some prefetch requests allows the C-BUS bandwidth that would otherwise have been used by PFU 240 for the prefetch requests to be used for other purpose by the L1 Cache 204, the BC 208, or the LDST 260.

3.2. BTC Access

Referring to FIGS. 3 and 6a, the BTC is accessed with the PFU IP address during PH1 of the first clock of the Decode stage for the instruction prior to the COF, i.e., the BTC is accessed at the same time the PFU begins transferring to the Decoder instruction bytes for the instruction prior to the COF. The BTC determines hit or miss by the end of PH1.

3.2.1. BTC Hit

If the BTC access hits, the BTC signals hit and outputs the L1 Cache index [11:4] (and associated 2 bit way number) for the target address, which is latched into the branch resolution buffer (BRB) 344. The L1 Cache index is gated onto the C-BUS by the pf_cbusctl block 308 in PFU 240, initiating a prefetch request to obtain the cache line that includes the target instruction.

The L1 Cache performs a cache lookup using the L1 Cache index [11:4] for set selection, and outputting a target cache line from the way location specified by the way number. In addition, the L1 tag array is accessed to obtain the corresponding cache tag [31:12] for the target cache line. Both the target cache line and the cache tag are returned to the PFU/BU.

The cache tag is copied into the BRB 344, and combined with the L1 Cache index output from the BTC, such that the BRB stores a complete physical address [31:0] as a speculative target address. When the COF reaches the AC stage, the target linear address is calculated in AC1 and translated in AC2 to obtain the actual target physical address. The actual target physical address from AC is compared to the speculative target address stored in the BRB—a mismatch may occur if either (a) the actual target cache line was replaced in the L1 Cache, or (b) if the actual target address was modified.

If the actual target address and the BRB address mismatch, and the COF was predicted taken and resolves taken in the EX stage, then the corresponding BTC entry is invalidated during the WB stage, and a new target address is sent to the PFU (resulting in a 5 cycle target address mismatch penalty). If no mismatch occurs, indicating the prefetch resulting from the BTC his correctly retrieved the target cache line, the BU will update the prediction history bits, the IB buffer location bits, and LRU bits during the EX stage of the COF.

Note that the prefetch request is generated before the instruction prior to the COF completes decoding. As a result, if the prefetch request hits in the L1 Cache, the target cache line may be returned prior to the COF decoding, requiring the PFU 240 to allocate an IB buffer for the target cache line (see, Section 4.2).

FIG. 8a illustrates the timing in the BTC for BTC hits.

3.1.4. BTC Miss

Referring to FIG. 6a, if a COF misses in the BTC, then an entry in the BTC will be allocated (a) for UCOFs, and (b) for conditional COFs (branches or LOOPs) that resolve taken.

The COF will be decoded in the ID stage, and an entry allocated in the BRB. The target address is calculated during AC stage. If the COF resolves taken in the EX stage, and if the COF is cacheable, the target information is written into the BTC during the WB stage. The prediction history bits are set to weak taken state 3, predicting taken for the next iteration, the instruction buffer location bits are set to 0, and the LRU bits for the set are updated.

If allocating the COF into the BTC requires replacing another entry, a pseudo-LRU algorithm is used to select the way for allocation/replacement in the selected set. If an invalid way exists, it will be chosen for allocation, otherwise if a predicted not-taken entry exists it will be chosen for replacement. Finally if all four ways in the set are valid and predicted taken, the least recently used entry will be replaced.

FIG. 8b illustrates the timing in the BTC for BTC writes.

3.3. Return Stack

FIG. 9 illustrates the return address stack (RSTK) 342. The RSTK holds the predicted target addresses for RETurn instructions.

Return addresses are pushed onto the stack when a CALL is decoded (whether or not the CALL hit in the BTC), with the return address being supplied over pf_idpip. Predicted return addresses are popped off the stack when the RETurn instruction is decoded, and output onto pf_ifa for use in prefetching.

The exemplary RSTK 342 holds 8 entries. Each entry is a 32 bit physical return address—because the RSTK only holds 8 entries, storing actual return target addresses rather than L1 Cache indices as in the BTC does not result in a significant die area penalty.

Note that the use of the return address stack permits the Branch unit to supply the return target address the first time the RETurn is decoded, even though the associated CALL will not be entered into the BTC. The second time the CALL is encountered, it will hit in the BTC which will supply the CALL target prefetch information from which a prefetch request for the CALL target will be generated. Operation of the RSTK is the same regardless of whether the corresponding CALL hits in the BTC.

3.4. Branch Prediction

FIG. 10 illustrates the exemplary branch prediction strategy. Branch (and LOOP) prediction uses two history bits stored with each branch. The two bits encode the states 0 through 3 as shown.

States 0 and 1 predict a branch not taken, and states 2 and 3 predict a branch taken. The transitions between the states are determined by the actual behavior of the branch.

When an entry is first cached in the BTC, its prediction history bits are set to state 3 predicting taken on the next iteration.

3.5. Branch Resolution Buffer

FIG. 11 illustrates the organization of the branch resolution buffer (BRB) 344. The BRB is used to track change of flow instructions through the execution pipeline, and to resolve the target address and, for conditional COFs, the target direction. In particular, conditional COFs are resolved based on the condition code results available during EX.

BRB entries are allocated either in response to a BTC hit, or in the case of a BTC miss, in response to the decode of the COF. Because COF direction is not resolved until the EX stage, it is possible that one COF could be resolving in the EX stage, while a second COF is in the AC2 stage, a third COF is in the AC1 stage, and a fourth COF is in the ID stage. Therefore, the BRB requires four entries to cover all cases of COF instructions in the pipeline.

The Entry field in the BRB indicates which entry in the BTC that the COF instruction hit in so that the entry may be updated without having to access the BTC. The entry is formed by the IP bits [4:0]which index into the BTC plus the BTC way number to select a particular entry.

The Target Address field holds the physical target address for a COF that hit in the BTC. This value is retrieved from the cache tags returned by the L1 Cache in response to a prefetch request. This value is compared against the actual target address (from AC) before the COF is resolved.

The Not Taken Address field holds the address of the next instruction following the COF. This value is sent to the PFU when a COF resolves not taken.

4. Virtual Buffer Management

Referring to FIGS. 4a and 4b, PFU 240 employs a virtual buffer management scheme to control the allocation of prefetched instruction bytes into the three prefetch buffers IB0, IB1, and IB2. Each of the IB prefetch buffers holds one 16-byte, memory-aligned prefetch block (cache line) of instruction bytes (with separate valid bits for each 4-byte dword in the block).

The physical IB prefetch buffers are logically allocated as CURR, NEXT, and PREV buffers (or blocks), where: (a) CURR is allocated to buffer the prefetch block from which instruction bytes are currently being transferred to the decoder, (b) NEXT is allocated to buffer the prefetch block that will next be reallocated as CURR (assuming sequential prefetching), and (c) PREV is allocated to the deallocated CURR block.

In addition, in the case of a COF (other than a short COF), two temporary tags may be assigned to the PREV IB buffer: (a) for BTC hits on COFs dynamically predicted taken, TARG is assigned when the BTC hits designating the PREV IB buffer to receive the target block prefetched by the PFU/BU, or (b) for BTC misses, N_PRED is assigned when the COF decodes to designate the PREV IB buffer to store the not-predicted path. Regarding N_PRED (a) for LOOPs statically predicted taken, the CURR IB buffer, which holds the not-taken address, will be reallocated to PREV and then tagged N_PRED, and (b) for branches statically predicted not taken, the PREV IB buffer will be tagged N_PRED to receive the not-predicted target block prefetched by LDST—the N_PRED tagged IB buffer will be allocated as CURR if the COF resolves mispredicted.

The virtual buffer management scheme avoids any need to physically transfer contents between buffers.

The pf_adctl logic 306 implements the virtual pointer scheme using internally maintained IB tags CURR, NEXT, and PREV, as well as the TARG and N_PRED tags. Pf_adctl maps the IB tags to a respective physical IB prefetch block IB1–IB3, generating control signaling to the pf_dpath logic 302. Each IB tag comprises a bit vector indicating a respective IB buffer IB1, IB2, or IB3.

4.1. Sequential Prefetch

Referring to FIGS. 3 and 4a, sequential prefetching occurs unless the code stream is interrupted by: (a) a COF or exception, (b) self-modifying code, or (c) a segment limit or page boundary. In sequential prefetching, the three IB buffers are operated as a circular queue.

As instruction bytes are transferred from the CURR IB buffer to ID 211 for decoding, the byte pointer from pointer control 314 increments in response to the id_shift signal until the CURR buffer is exhausted. At that point, pf_adctl 306 uses the virtual buffer management scheme to logically reallocate the IB buffers—the IB tags are remapped such that
CURR—>PREV NEXT—>CURR
while the next prefetch block is fetched into
NEXT<—PREV
That is, the new NEXT IB buffer (previously the PREV IB buffer) is cleared, and the PFU outputs a prefetch request for the next sequential prefetch block.

Thus, the PFU attempts to prefetch at least one 16-byte prefetch block ahead of the instruction bytes being transferred out of CURR to the Decoder.

Normally, the returned prefetch block is directed into the NEXT buffer. However, situations can occur in which two IB buffers are empty when a prefetch block returns over the C-BUS (for example, if the prefetch request missed in the L1 Cache and was directed off-chip in an external bus cycle). In this case, the returning prefetch block will be loaded by pf_adctl 306 into the new CURR IB buffer, and a new prefetch request will be issued to load the new NEXT IB buffer. Another possibility is that when a COF is encountered, two fetches in the two different paths of the COF—predicted not-taken and not-predicted taken—may be pending.

To handle the situation in which two prefetch requests may be pending and two IB buffers available, the pf_adctl logic 306 maintains two more IB tags—HFILL and MFILL, which function in a manner similar to the CURR, NEXT, and PREV tags. The HFILL tag specifies where data coming from a cache hit should be placed, and the MFILL tag specifies where data coming from an external linefill should be placed. When a prefetch request is generated, the HFILL tag points to CURR or NEXT buffer, whichever one is to be filled. If the L1 Cache signals a hit, the HFILL tag directs the prefetch block from the C_IDATA bus to the designated buffer—if the request misses in the L1 Cache, the PFU waits until the first bus cycle of the external burst fill cycle, at which time the MFILL tag is set to point to the IB buffer to be filled.

The MFILL pointer stays constant for the duration of the burst fill cycle, regardless of whether the queue shifts and a second prefetch request is generated. This tag is then used to control placement of data from the C_DATA bus into the appropriate IB buffer.

If the Decoder stalls waiting for fetched instruction bytes, the HFILL and MFILL tags are used to simultaneously route the incoming prefetch block from C_IDATA or C_DATA data straight through the aligner 117 to ID 211, at the same time the block is loaded into the appropriate IB buffer.

4.2 Normal COFs

A normal COF is a COF that is not a short COF, i.e., a COF for which the target address is not already in one of the IB buffers, and must be fetched. Virtual buffer management for normal COFs involves: (a) completing decode of the COF, and (b) assigning the TARG or N_PRED tags to the appropriate IB buffer to receive a prefetched predicted or not-predicted target.

Referring to 5a–5c, the CURR IB buffer IB2 contains all or part of the N-1 instruction previous to the COF, which partially or completely resides in NEXT IB buffer IB3. That is, either the N-1 instruction or the COF are misaligned such that both IB buffers are required to complete decode of the COF, with the IB buffers being reallocated

```
NEXT->CURR
PREV->NEXT
CURR->PREV
``` as the N-1 and COF instructions decode. Note that, the physical IB buffer logically allocated as PREV will be assigned TARG or N_PRED either at BTC hit time or, for BTC misses, at the time the COF decodes—if logical buffer reallocation is required to complete COF decode, then the physical IB buffer logically allocated as PREV will be logically reallocated as NEXT, but the TARG or N_PRED tag will continue to point to that physical IB buffer (i.e., the new NEXT).

Referring to FIG. 3, when the N-1 instruction starts decoding, the BTC 242 is accessed with the N-1 IP—if the access hits, the PFU 240 will prefetch the target (unless the COF is a conditional COF predicted not-taken), while if the access misses, the LDST 260 will prefetch the target as either the statically predicted or not-predicted path of the COF. That is, the target prefetch block will be prefetched unless a BTC hit results in a dynamic not-taken prediction.

For the exemplary virtual buffer management scheme, once the PREV IB buffer has been assigned either TARG or N_PRED, the CURR IB buffer continues to deliver instruction bytes to the decoder, and if necessary, the NEXT IB buffer can then be reallocated CURR to continue sequential prefetching, so that:

```
NEXT->CURR
CURR->PREV
PREV (TARG/N_PRED)->NEXT
```

If the new CURR IB buffer is exhausted without completing decode of the COF, then normal sequential prefetching proceeds with
NEXT CYARG/N_PRED)->CURR
In this case, the TARG/N_PRED tag is invalidated, the new CURR buffer is cleared, and a the Prefetch unit issues a prefetch request for the next sequential prefetch block. Alternatively, while a physical IB buffer is assigned either TARG or N_PRED, the other two IB buffers may be logically reallocated CURR and NEXT as a two block circular queue.

4.2.1. BTC Miss

Referring to FIGS. 3 and 4a, for BTC misses, the target address (available in AC2) will be prefetched by LDST 260—for UCOFs and LOOPs, the LDST prefetches the statically predicted taken path, while for branches, the LDST prefetches the statically not-predicted taken path.

At decode time, pf_adctl 306 reallocates the IB tags for the IB buffers IB1–IB3 to receive the target prefetch block. Pf_cbusctl 308 tracks when a target prefetch request is aborted—for example, an exception occurring when generating a target address will abort the target prefetch request from LDST.

For UCOFs, the IB buffers are simply cleared, and the PFU stops prefetching to wait for the target fetch from LDST. No special IB reallocation is required, and the target prefetch block is loaded into the CURR IB buffer, followed by a PFU prefetch of the next prefetch block into the NEXT IB buffer.

FIGS. 12a and 12b illustrate the exemplary virtual buffer management scheme for COFs that miss in the BTC. When the COF decodes, the physical IB buffer logically allocated as PREV is assigned the N_PRED tag.

Referring to FIG. 12a, if the static prediction for COF direction is taken (LOOPs), then when the COF decodes the PFU discontinues transferring instruction bytes from the CURR IB buffer—the IB buffers are reallocated

---

CURR->PREV
NEXT->CURR
PREV->NEXT

---

CURR and NEXT are cleared—the LDST unit will issue a prefetch request for the target prefetch block during AC which will be loaded into CURR and the Prefetch unit will issue a prefetch request for the next sequential prefetch block to be routed to NEXT.

After IB buffer reallocation, PREV holds the not-predicted (not-taken) path an is assigned N_PRED. The COF moves to the EX stage, followed in the execution pipeline by instructions in the predicted-taken path—if the COF resolves mispredicted, N_PRED is reallocated as CURR and instruction bytes in the not-predicted (not-taken) path are transferred to the Decoder.

Referring to FIG. 12b, if the static prediction for COF direction is not taken (branches), then sequential prefetching will continue in the not-taken path from the CURR IB buffer. PREV will be tagged N_PRED, an he LDST unit will prefetch the not-predicted target prefetch block, which will be loaded into N_PRED.

Again, if the COF is mispredicted, the N_PRED IB buffer is allocated as CURR and the Prefetch unit switches to the not-predicted target instruction.

In either case, if the static prediction for the conditional COF is correct, the buffered instructions in the not-predicted direction are cleared, and the lb buffer is available for normal sequential prefetching.

Referring to FIG. 3, far COFs present an added complication because, in many cases, the target prefetch request for a far COF is issued a number of cycles before it completes. As a result, updating machine state for the new segment is delayed, stalling instruction decode even though target instructions may already have been fetched. Specifically, many far COFs are decoded as mode-change instructions—ID 211 signals the PFU 240 when a mode-change COF is decoded, and then stalls until EX signals that COF execution is complete even though the PFU is enabled to receive target instructions and even to prefetch beyond the target and completely fill the IB.

When an exception is signaled, the PFU clears the entire prefetch buffer 242 (IB1-IB3) and stalls prefetching—LDST 260 issues the initial target prefetch request to retrieve the appropriate exception handling routine. Reset is treated similarly—upon reset, the PFU emerges waiting on a fetch from the LDST for the first block of instructions, and then begins prefetching from that point.

4.2.2. BTC Hit

For BTC hits that result in a taken prediction, the PFU/BU will issue a target prefetch request as the instruction previous to the COF is decoding. As a result, if the target prefetch request hits in the L1 Cache, the returned target prefetch block generally will have to be buffered for at least one cycle to allow the COF instruction to complete decoding.

When the BTC hit is signaled, the PREV IB buffer is cleared, and pf_adctl assigns a TARG tag to identify the IB buffer that will receive the prefetch target block. At the same time, the bottom 4 bits of the target address are saved in the pointer control logic (314 in FIG. 3) to provide as the byte pointer for the target instruction within the target prefetch block. The PFU continues sequential prefetching into the CURR and NEXT IB buffers to insure that all bytes necessary to decode the ensuing COF instruction are fetched.

FIG. 12c illustrates the exemplary virtual buffer management scheme for COFs that hit in the BTC. When the BTC signals hit based on the access with the IP for the instruction previous to the COF, the physical IB buffer logically allocated as PREV will be assigned the TARG tag—the Prefetch unit will issue a prefetch request for the target prefetch block. When the COF decodes, the TARG IB buffer (which may now contain the target prefetch block) will be allocated as CURR and instruction byte transfer to the Decoder will commence with the target instruction.

In issuing the target prefetch request, the PFU/BU only supplies the L1 Cache index (plus the way number) for the target address. As a result, this target prefetch request is disallowed from going off-chip (the PFU aborts the request as it is issued). When the target prefetch request issues, the HFILL tag is set equal to the TARG tag to indicate a return from the L1 Cache is expected.

If the target prefetch request hits in the L1 Cache, the returned prefetch block is loaded into the IB buffer designated by the TARG tag. When the Decoder signals that the COF has finished decode, the CUR IB tag is set to the TARG tag, and NEXT and PREV IB tags are reallocated accordingly. Using the TARG byte pointer, the PFU initiates an 8-byte transfer to the Decoder commencing with the initial target instruction byte. The NEXT and PREV IB buffers are cleared, and the PFU commences sequential prefetching.

If the target prefetch request misses in the L1 Cache, the PFU will stall after the COF decodes. When the COF reaches EX and resolves, the BU provides the correct target address (assuming the COF is a UCOF or resolves taken) for a prefetch request.

For the exemplary implementation, if a BTC hit is signaled but the PFU cannot issue a target prefetch request over the C-BUS before the instruction prior to the COF finishes decode (such as due to heavy C-BUS traffic), the PFU forces ID 211 to stall by disabling further instruction byte transfers. Stalling the ID insures that the COF instruction does not start decoding before the its target prefetch request issues, thereby preventing another BTB hit for a subsequent COF as the initial COF is decoding.

Because the exemplary BTC organization allows aliasing (see, Section 3.1), a BTC hit may result from the IP for an instruction that aliases with an the IP for an instruction that is prior to a COF. A BTC non-COF alias will be detected when no COF is decoded, and the PFU will clear the TARG IB buffer—sequential execution will continue without interruption using instructions already prefetched into the other blocks.

4.2.3. RSTK

Referring to FIGS. 3, 6a, and 8, the RSTK is accessed when a RETurn is decoded—a RSTK hit results in the RETurn target address being popped off the RSTK and supplied to the PFU. The RSTK supplies the full [31:0] physical target address, which the PFU uses to generate a RETurn target prefetch request. The operation is similar to a COF that misses in the BTC, except that the PFU is able to generate the prefetch request rather than waiting for the LSDT to initiate the prefetch request in the AC stage.

Prior to issuing the RETurn target prefetch request, the PFU clears all IB buffers—any prefetch blocks returned in response to prior prefetch requests will be ignored. The returned target prefetch block is loaded into the CURR IB buffer (using the HFILL and MFILL tags), and the PFU will continue sequentially prefetching down the new path.

4.3. Short COFs

FIG. 5d illustrates short COF conditions in which the target of a COF has already been prefetched into one of the IB buffers IB1–IB3. The virtual buffer management scheme implements a mechanism for detecting short COF conditions, allowing the PFU to supply the target instruction to the Decoder on the next cycle, thereby avoiding a target prefetch request (with attendant power saving and C-BUS performance enhancement).

Referring to FIGS. 4b and 6c, each entry in the BTC includes a three-bit IB_LOC field that, when valid, stores the logical tag—CURR, NEXT, PREV—for the IB buffer in which the target instruction is located. As described in Section 3.1.2, the second time a short COF is encountered, the PFU compares the target physical address (i.e., the L1 Cache index [11:0] from the BTC and the L1 Cache tag [31:12] from the L1 Cache) to the prefetch address tags in each of the IB buffers—if a match occurs, indicating that the cache line containing the target is already in one of the IB buffers, the IB_LOC field for that entry is updated with the associated IB tag. IB_LOC is a logical pointer because the physical IB buffers to which the logical tags CURR/NEXT/PREV are assigned may change.

Referring to FIGS. 3 and 4a, a short COF BTC hit sequences similarly to a normal BTC hit. When the hit is signaled, the BU provides the target IB tag from the IB_LOC field, identifying the location of the target as within the CURR, NEXT, or PREV IB buffer. The CURR/NEXT/PREV IB buffer indicated by the target IB tag from IB_LOC is checked for validity, and if valid, the PFU inhibits a target prefetch request (by not gating the L1 Cache output from the BTC onto the C-BUS)—until the COF decodes, the TARG IB tag is assigned to the IB buffer designated by IB_LOC (which may be the CURR NEXT, or PREV IB buffer), allowing IB buffer reallocation to continue as the COF instruction bytes are transferred to the Decoder. If the contents of the designated IB buffer are not valid, the PFU treats the COF as a normal BTC hit, and issues a prefetch request for the target prefetch block.

Once the COF decodes, the PFU commences transferring target instruction bytes to the ID—the location of the initial byte of the target instruction within a designated IB buffer is given by the byte location number [3:0] stored in the BTC along with the L1 Cache tag [11:4]. The IB buffer tagged TARG is allocated as the CURR IB buffer, and, if necessary, the other IB buffers are reallocated accordingly. However, the NEXT and PREV IB buffers are not cleared at this point (as they would be for a normal COF, because the sequence of prefetch blocks within the IB buffers has not been disturbed (even though the CURR/PREV/NEXT allocations may have changed)—as a result, the IB buffer holding instructions following new logical CURR IB buffer may still be used as the NEXT IB buffer if they are valid. The new PREV IB buffer instructions may be treated similarly. The prefetch address stored in pf_apath 304 is incremented by more than one prefetch block if both the CURR and NEXT IB buffers retain valid instructions after the COF is decoded.

Even though a detected short COF obviates a target prefetch request, to prepare for prefetching beyond the target, the prefetch registers in pf_apath 304 must be updated. Consequently, in response to the BTC hit, a target prefetch is cycled through the PFU, except that the L1 Cache index is not gated onto the C-BUS as a prefetch request. The prefetch address tag in the designated IB buffer provides the high order bits [31:4] of the target address, while the initial instruction byte pointer for the target instruction within the IB buffer is provided by the byte location number [3:0] driven onto the pf_if a bus from the BTC in response to the hit.

If a BTC hit results in a short COF match, and the IB buffer containing the short COF target is subsequently cleared before the short COF decodes, instruction prefetch is halted upon decode of the short COF, and a misprediction is signaled when the short COF completes EX. Also, if the NEXT-IP aliases to a short COF such that a BTC hit for the short COF is signaled but no COF decodes, the IB buffer tagged TARG is not cleared because by definition the contents of that IB buffer derive from normal sequential prefetching—if the TARG assignment incorrectly resulted from aliasing, the TARG tag should be removed and sequential instruction decode continued.

For the exemplary embodiment, a short COF compare on an IB buffer is not valid if the IB buffer is already tagged TARG or N_PRED for a previous COF, because such a designation may not apply if the short COF is again encountered. For example, if a normal COF that misses in the BTC and results in an IB buffer being tagged N_PRED is then followed closely by a short COF that hits in the BTC, it is undesirable to recognize a short COF match—if the first COF resolves taken, and the same code executes again, the first COF will then hit in the BTC and no N_PRED assignment will be made, such that the following short COF will now match on an IB buffer pointed to by IB_LOC that may not contain the same instructions (due to different IB buffer allocations depending on whether the N_PRED tag is active). As a result, a short COF match would cause a target address mismatch (misprediction).

4.4. Not-Predicted Path

Referring to FIGS. 3 and 4a, for conditional COFs that miss in the BTC, the PFU buffers the non-predicted path (either the not-predicted taken path for branches or the not-predicted not-taken path for LOOPs).

When a COF is decoded with no BTC hit, pf_adctl 306 reallocates the IB tags for the IB buffers to buffer the predicted and not-predicted paths—in particular, the PREV IB buffer is used to buffer instructions in the not-predicted path (see, Section 4.2.1). When the COF decodes, the N_PRED tag is assigned to the physical IB buffer that has been allocated as PREV (for example, IB1 in FIG. 5a) until the COF resolves in EX (or another COF decodes), even if that physical IB buffer is reallocated.

Similarly, in the pointer logic 314 of pf_dpath 302, an N_PRED pointer is maintained which represents the byte pointer to the first instruction of the not-predicted path within the N_PRED buffer. For branches (statically predicted not-taken), this pointer is acquired from the lower 4 bits of the target address as the target prefetch request is issued to the C-BUS by LDST. For LOOPs (statically predicted taken), this pointer is saved when the COF finishes decode—at that point ID 211 indicates the byte position of the instruction following the COF over the id_shift lines.

For cases in which both the predicted and not-predicted paths are buffered in the IB buffers, the MFILL and HFILL tags are used to coordinate the loading of incoming fetches, which may return during the same cycle. For instance, a pending prefetch request in the sequential (not-taken) path past the COF which missed in the L1 Cache may return data at the same time as the target prefetch request for the COF from the LDST hits in the L1 Cache. The MFILL and HFILL tags are used in conjunction with the CURR, NEXT, and N_PRED tags to properly route the data in the IB buffers IB1–IB3.

Specifically, if a second COF misses in the BTC before the first completes its EX stage, the N_PRED IB buffer for the first COF is cleared, and the N_PRED tag and pointer are then updated for the second COF. Similarly, the PF only buffers both paths of the most recent COF. Control logic in pf_cbusctl 308 tracks the number of pending COFs, identifying the target prefetch request from LDST for the most recent COF (i.e., in a multiple-COF situation, all but the latest target prefetch requests are ignored).

4.5. Mispredicted COF

If a COF is mispredicted (i.e., the statically or dynamically predicted direction does not match the resolved direction available in EX), the execution pipe is flushed, and the PFU switches to the correct path of the COF. The predicted path instructions in the prefetch buffer are flushed, and prefetch resumes in the correct direction. In addition to mispredicted conditional COFs, other conditions such as BTC aliasing can force the BU to signal a mispredicted COF (even if the COF is unconditional).

Referring to FIGS. 3 and 4a, in the case of a statically mispredicted COF that missed in the BTC, the prefetch buffer 242 may already contain the first prefetch block in the not-predicted path, stored in the IB buffer designated by the N_PRED buffer tag. If this IB buffer is still valid at the time of misprediction, the N_PRED buffer is reallocated as the new CURR IB buffer, with the N_PRED pointer used to identify the initial instruction byte of the not-predicted target or fall through instruction. The other IB buffers are reassigned NEXT and PREV, and cleared, and the PFU commences prefetching into the NEXT IB buffer.

If a misprediction results from a COF that hits in the BTC or RSTK, or for a COF that misses in the BTC and the N_PRED tagged IB buffer is not valid for some reason, then the correct not-predicted path instructions are not available in the IB buffers at the time the misprediction is signaled. When the BU signals the misprediction, the entire prefetch buffer is cleared, but the IB buffers are not reallocated, and sequential prefetch starts with the not-predicted address supplied by the BRB.

5. Limit Checking

The Prefetch unit includes mechanisms to ensure that segment and page boundaries are not crossed when the Branch unit supplies the prefetch target address. In particular, from the Background, to maintain compatibility with the 486 specification, instruction fetch (and decode) beyond a segment limit should result in a segment limit violation (exception).

FIG. 13 illustrates segment limit checking for normal sequential prefetching, as well as the exemplary scheme for detecting segment limit violations in the case of COFs that hit in the branch unit (BTC or RSTK).

5.1. Segment Limit Checking

Referring to FIG. 3, during sequential prefetching, PFU 240 conventionally detects whether a prefetch address is for a prefetch block that will contain a segment limit—if so, then if sequential decoding continues to the point of the boundary, the PFU signals a segment limit exception. If a page boundary is encountered, the PFU must initiate an address translation via TLB 230 to get the physical address of the new page from which it can continue prefetching.

The logic for maintaining the physical and linear prefetch addresses, and the segment limit address, and for segment and page limit checking, resides in pf_apath 304. The PFU maintains both the linear and physical prefetch addresses LA and PA (see, Section 2.3)—the lower 12 bits of the LA and PA are identical.

Referring to FIG. 12, the pf_apath logic includes three registers used in segment limit checking: (a) CSLA 361 holds the linear address of the segment limit, (b) PRLA 362 holds high order 20 bits [31:12] of the linear prefetch address, and (c) PRPA 363 holds the physical prefetch address [31:0], including the low order 12 bits [11:0] that are the same for the linear address. CSLA is loaded from the AC_LABUS (FIG. 3) any time a new code segment is entered.

The high order 20 bits of PRLA are obtained as follows: (a) during sequential prefetching, if the PRPA address is incremented and a carry-out occurs from the 12th bit, the PRLA is incremented, (b) if a COF is encountered and predicted taken, the PRLA is loaded with the target linear address calculated when the COF reaches AC and supplied over the AC_LABUS, and (c) if a conditional COF is resolved mispredicted, AC 212 provides the correct linear address.

During sequential prefetching, prior to issuing a prefetch request, the linear code segment limit address in CSLA is compared (365) with the linear prefetch address formed by the high order PFLA bits [31:12] and the low order PFPA bits [11:3] (i.e., 16-byte prefetch block granularity). If a match occurs (366), the segment limit is known to be somewhere in the prefetch block—when the prefetch block is loaded into an IB buffer, the lower bits [3:0] of the segment limit address are used to mark the valid bytes that precede the boundary by setting (367) the appropriate segment valid bits SV and segment limit bits SL (see, Section 4.1).

If a prefetch block contains a segment limit, the PFU stops prefetching. If a taken COF is encountered, or if an exception is encountered, prefetching resumes at the target or exception handler. Otherwise, normal sequential decode will proceed, with the PFU sequencing through the IB buffers as it delivers instruction bytes to ID 211 until the PFU detects that (a) the CURR IB buffer contains a segment limit (SL set), and (b) all valid bytes in the IB buffer have been transferred to the decoder—at this time, a segment limit exception will be signaled.

The exemplary PFU does not include independent linear-to-physical address translation capability (relying instead on AC/TLB). However, in the case of a BTC/RSTK hit, the PFU will not have the corresponding target linear address when the target prefetch block returns (available only when the COF reaches AC). Thus, the PFLA register will be invalid for the returned prefetch block. If the target address has jumped into a cache line containing the segment limit in the CSLA register, the PFU will not be able to perform a comparison to detect a segment limit violation.

Referring to FIG. 3, COFs that miss in the BU do not present a problem. When the COF reaches AC 212, the target linear address is calculated, and if paging is enabled, the TLB 230 performs linear-to-physical translation. The target LA and PA are supplied to the LDST 260 for prefetching the target address as either the predicted or not-predicted path of the COF, and to the PFU to update its PFLA and PFPA if the COF is predicted taken—if the COF resolves mispredicted, the PFU will correspondingly update the PFLA and PFPA. The PFU performs a segment limit check when the PFLA is supplied during AC1, and the results of the comparison are saved until the target prefetch block returns.

Far COFs (which will always miss in the BU) are not a problem, either, because the CSLA register will be updated before the target prefetch request is issued from LDST 260.

Referring to FIG. 12, in the case of COFs that hit in the BTC/RSTK 252/342, the exemplary PFU issues the target prefetch request, and performs a CSLA segment limit comparison (371) using (a) bits [11:3] of the target address supplied by the BTC or RSTK, and (b) bits [11:3] of the existing code segment limit address in CSLA 361. If no match occurs, prefetching continues—any subsequent sequential prefetches prior to target linear address availability from the AC stage 212 will also only use bits [11:3] of the physical prefetch address for segment limit comparison.

If a CSLA match occurs (372) with bits [11:3] of a BTB/RSTK, STK target prefetch address, or any of the ensuing sequential prefetch, prefetching stops, and a potential segment limit violation condition is detected (373). The instruction bytes of the returned prefetch block are marked as if a segment limit violation was detected, i.e., the SL and SV bits for the prefetch block are appropriately set (374). The Prefetch unit will continue transferring instruction bytes to the Decoder up to the potential segment limit, and then stall.

When the COF reaches AC 212, and the target linear address is calculated, the upper linear address bits [31:12] of the last prefetch request become available for CSLA comparison (375) to determine if an actual segment limit violation occurred. If the CSLA upper bit comparison matches (376), the PFU will continue delivering instruction bytes to the Decoder up to the segment limit and then signal a segment limit exception (or if Prefetch transfer has already reached the segment limit, immediately signal a segment limit violation). If the CSLA upper bit comparison mismatches, state information indicating a potential segment limit violation is cleared (377), and sequential prefetch continues (i.e., the SL bits in all IB buffers are reset, and the SV bits are all set).

Referring to FIG. 3, when a conditional COF is mispredicted, a similar problem exists. The exemplary BU 250 stores physical addresses in its BRB (branch resolution buffer)—for COFs, the exemplary AC unit 212 maintains a copy of the linear address for both the taken and not taken paths of a conditional COF.

A misprediction is signaled when the COF resolves in EX, and in that same cycle the PFU either (a) issues a prefetch request using the not-predicted COF address from the BRB, or, (b) if the not-predicted path is already buffered in an IB buffer, the PFU switches to the not-predicted path in transferring instruction bytes to the Decoder. However, the exemplary AC unit does not provide the linear address of the proper instruction path until the next cycle, which is too late to check whether the segment boundary lies in the first 8-byte transfer to the Decoder.

No problem arises if the not-predicted path is already buffered at the time of misprediction, because segment limit checking would already have been done when that prefetch block was fetched. Otherwise, a CSLA comparison must be performed on bits [11:3] of the physical misprediction prefetch address from the BRB—a partial match condition is noted, and then tested when the full linear address is available from AC in the next cycle.

One other segment limit case requires special handling in the exemplary PFU. If a predicted-taken COF resides at the segment limit, and the COF resolves not-taken, the segment limit is violated—if the COF also resides at the end of a cache line, then the address supplied by BRB for misprediction prefetch request will be to the following cache line. Consequently, if the PFU uses bits [11:3] of the physical address from BRB for CSLA comparison, then a match condition will be missed.

The exemplary PFU and BU handle this situation by detecting when a COF resides at the segment limit during normal segment limit checking. The BU is signaled that such is the case, and this information is stored in the BRB with other information about the COF. If the COF was predicted-taken, and resolves not-taken, the BU signals the PFU of the special case, which will then signal a segment limit violation.

5.2. Page Limit Checking

When prefetching encounters a page limit, the PFU initiates a TLB lookup to generate a new physical prefetch address. That is, when a page limit is encountered, even if the segment limit has not been reached, it is not known whether the next linear page is sequentially placed in physical memory. In a manner similar to the detection of segment limits, the PFU must determine whether a prefetch request contains a page limit—such detection is made easier by the fact that page boundaries are aligned to 16-byte cache line (prefetch block) boundaries.

Referring to FIGS. 3 and 4a, for normal sequential prefetching, when a prefetch request is issued, the physical address is incremented and used to update the PRPA register in preparation for the next sequential prefetch (see, Section 2.3). Because page size is fixed at 4K bytes, if incrementing the physical address of an outgoing prefetch request causes a carry-out from the 12th bit position, a page boundary exists at the end of the prefetch block being fetched—when the prefetch block returns and is loaded into an IB buffer, the PL bit is set (see, FIG. 4b and Section 2.1).

When a page limit condition is detected, the PFU will then initiate a TLB access with the linear address for the next prefetch from PRLA—this PRLA address will point to the new page since its value was updated as the prefetch request issued. In the exemplary processor, the PFU must compete with the AC unit 212 for access to the TLB, and the PFU is given lower priority—thus, it may be several cycles before the PFU access is granted. If the PFU access hits in the TLB, the LDST unit 260 issues the prefetch request using the new translated physical address (which is also supplied to the PFU for updating the PFPA register).

If the PFU access misses in the TLB, the instruction fetch is aborted by LDST, and the PFU idles pending reaching the page boundary. The LDST prefetch request is aborted for performance reasons—a tablewalk is avoided until it is known that the new page will be required. The PFU will continue to transfer instruction bytes to the ID 211 up to the page limit—if a taken COF or an exception is encountered, prefetching resumes at the COF target or exception handler (thereby obviating the tablewalk for the new page).

If sequential prefetching proceeds into the IB buffer with its PL bit set, and instruction decode reaches the last byte of this buffer without a COF or exception, it is then known that the page boundary will be crossed. The PFU will again access TLB for a translated physical address, and this time the tablewalk will occur. Sequential prefetching will continue with the prefetch request from LDST.

In the case of a predicted-taken COF, as in the case of segment limit checking, the target linear address is not immediately available after a BTB or RSTK hit. This address is required for the PFU to access the TLB to acquire the physical address for the new page. Consequently, after a BTC/RSTK hit, if a page limit is detected, the PFU halts prefetching until the COF reaches the AC stage and the target address is calculated.

The exemplary PFU 240 includes logic in pf_apath 302 to handle three special cases: (a) similar to segment limit checking, the case where a predicted-taken COF resides at the page boundary, and resolves to be not-taken, (b) the case where prefetching along the not-predicted path of a COF causes the PFU to access the TLB and that access misses, which would then cause a tablewalk that might not be necessary, and (c) a special case for 486 compatibility.

Regarding predicted-taken COFs at a page boundary, the not-predicted address provided by the BRB will already have been incremented to the new prefetch block (and thus to the next sequential page frame), so the PFU would not detect a page limit violation. To handle this case, the PFU signals the BU when the COF is transferred to ID 211 that the page boundary has been reached—this information is saved in the BRB and, if the COF is predicted taken and resolved not-taken, the PFU is signaled. The PFU will then abort the misprediction prefetch, and use the linear address for the not-predicted path provided by AC to access the TLB.

Regarding the case where prefetching along the not-predicted path of a COF causes the PFU to access the TLB and that access misses, for performance reasons, the exemplary PFU suppresses the tablewalk. The COF continues into EX as if its target address had hit in the TLB. If the COF is mispredicted, the BU signals the PFU, which uses the linear address from AC to access the TLB for the proper target physical address—the PFU will abort its own misprediction fetch, and allow the prefetch request to issue from LDST after TLB translation.

Regarding the 486 compatibility issue, when the PG or PE bit is altered in CR0 it is possible that the translation of the page from which execution is currently occurring can be changed. According to the conventional 486 specification, if this occurs, the change does not take effect until either: (a) instruction decode reaches the end of the cache line (prefetch block) containing the write to CR0 that changed either the PG or PE bit, or (b) a taken COF is encountered. For the exemplary processor, the TLB signals the PFU whenever the PG or PE bit is altered—the PFU sets an internal state which causes the PFU to initiate a TLB lookup in prefetching the next prefetch block beyond the one which produced the write to CR0. If a COF is encountered, proper translation of target and not-taken addresses should fall out.

6. Detecting Self Modifying Code

From the Background, the 486 specification on self-modifying code provides that to guarantee that the modification of an instruction takes place before the instruction is dispatched for execution, a write that modifies an instruction should be immediately followed by a JMP to that instruction. Significant complexities are introduced in handling self-modifying code because of existing code that does not follow the 486 specification, and by the use of branch processing and store buffering.

Referring to FIGS. 1a, 3, and 4a, the exemplary processor 200 detects self-modifying code in three ways: (a) for compatibility with the 486 specification, the LDST unit detects when a store is followed by a COF that hits in the BTC/RSTK, where the store address and the target address (supplied by the BTC/RSTK) are the same, (b) the PFU 240 snoops the C-BUS for stores from the LDST 260, and compares the store address to (i) each of the IB buffer prefetch address tags (see, FIG. 4a), and (ii) the addresses of any of its pending prefetch requests, and (c) the LDST unit snoops prefetch addresses issued by the PFU, and compares any prefetch address issued by the PFU or the LDST to addresses of active stores queued in the store reservation stations 262.

FIGS. 14a–14c illustrate the exemplary scheme for detecting self-modifying code using respectively (a) an implementation of the 486 jump/store specification for JMPs that hit in the BTC, (b) Prefetch unit snooping of store addresses for comparison with pending prefetch requests and prefetch blocks already in the prefetch buffer blocks, and (c) LDST unit snooping of prefetch requests for comparison with stores queued in the LDST store reservation stations.

Referring to FIG. 14a, for compatibility with the 486 specification, the LDST unit compares the most recent store address with the target address of a COF that hits in the BTC/RSTK, such that the target instruction may have followed the COF into the execution pipe. Specifically, the LDST is notified when a store reaches AC (381)—the store address from the AC/TLB is latched (382) in LDST, which then allocates a reservation station. The LDST maintains the latched store address in a separate register—if the LDST is signaled by AC that a COF that hit in the BTC has followed the store into the execution pipe (384), the LDST compares (386) the latched store address with the target address from AC/TLB. If the store and COF address match, LDST signals the BU (387), which forces a COF mispredict signal (388) when the COF reaches EX (flushing an unmodified target instruction that may be behind it).

Referring to FIG. 14b, in the case of PFU snooping, when a store to an instruction is detected (391), the PFU must insure that the updated instruction bytes are delivered to the ID stage. Consequently, the PFU detects (392) cases where a store will affect either (a) instruction bytes currently stored in its IB buffers (393), or (b) the instruction bytes it is in the process of fetching (394)—in those cases, the altered code is flushed and prefetching begins.

In the case of stores that affect pending prefetch requests, the PFU snoops the C-BUS and compares store addresses to pending prefetch requests—a match indicates that the prefetch block to be returned contains code that will be modified by the store. The pending prefetch request is marked, and, when it completes, the data is cleared (401). When the LDST signals (402) that the store is complete, the prefetch request is conditionally retried (403).

In the case of stores that affect code in its IB buffers, if the PFU snoops a store which hits one of the IB buffers (i.e., matches to the prefetch address tag for the IB buffer), the action taken depends on IB buffer allocation (411). If the IB buffer is tagged as either PREV or the N_PRED, it is simply cleared (412)—neither of these virtual buffers is needed for proper functioning, only for performance enhancement. If the IB buffer is tagged TARG, it is also cleared (415), but the BU is signaled (416) that the target instructions for the BTC hit underway have been nullified—when the COF decodes, the TARG IB buffer will be allocated as CURR although, TARG having been cleared, no instructions will be valid. As a result, instruction decode will stall until the COF completes in EX, at which time the BU will signal a misprediction (417), and the PFU will respond by re-fetching the target, this time including the modified instructions.

Finally, if a store matches either the CURR or NEXT IB buffer, both are cleared (421). When the LDST signals that the store is complete (422), the PFU re-fetches (423) the cleared prefetch block so that decode can proceed—the address tag associated with the CURR IB buffer is used as the prefetch address, and sequential execution commences once this prefetch request issues and the pf_apath logic updates its registers.

Referring to FIG. 14c, in the case where the LDST unit detects prefetch requests (431) that match (432) pending (queued) store addresses in LDST reservation stations, the PFU is signaled (435). The PFU prevents the returned data from being delivered to ID (436). When the LDST unit signals that the queued stores have been retired (437), the PFU retries the prefetch request.

If the prefetch request misses in the L1 Cache, the LDST snoop signal arrives too late to abort the prefetch request from going off-chip—the PFU waits until the external bus cycle completes, and then clears (436) the returned prefetch block.

7. Conclusion

Although the Detailed Description of the invention has been directed to certain exemplary embodiments, various modifications of these embodiments, as well as alternative embodiments, will be suggested to those skilled in the art.

In particular, while the implementation of the invention for detecting segment limit violations during branch processing has been described with respect to an exemplary processor architecture and computer system configuration, the invention has general application to minimizing prefetch stalls in performing segment limit violation checks when a branch unit does not supply the target linear address, thereby enhancing prefetching operations, and execution pipeline performance, in other processor architectures, and for other system applications.

For example, specific register structures, mappings, bit assignments, and other implementation details are set forth solely for purposes of providing a detailed description of the invention.

Also, references to dividing data into bytes, words, double words (dwords), quad words (qwords), etc., when used in the claims, are not intended to be limiting as to the size, but rather, are intended to serve as generic terms for blocks of data.

Moreover, various modifications based on trade-offs between hardware and software logic will be apparent to those skilled in the art.

The invention encompasses any modifications or alternative embodiments that fall within the scope of the claims.

I claim:

1. A processor implementing a scheme for detecting segment limit violations for COF (change-of-flow) targets when a branch unit does not supply the target linear address, the processor using a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same), comprising:

(a) a prefetch unit that issues prefetch addresses for prefetch blocks of instruction bytes, and loads prefetch blocks of instruction bytes into a prefetch buffer for transfer to a decoder;

(b) a branch unit having a branch target cache (BTC) that for selected COF instructions provides target address information that is used to generate a prefetch address, the target address information including at least a portion of the low order part of the LA but not including all of the high order part of the LA;

(c) limit checking logic that stores
  (i) a CSLA address corresponding to the linear address of the segment limit;
  (ii) a PFLA address corresponding to the linear address of the next prefetch address to be issued by the prefetch unit;
  (iii) a PFPA address corresponding to the physical address of the next prefetch address to be issued by the prefetch unit;

(d) for sequential prefetching, the prefetch unit issues a prefetch address corresponding to the PFPA address, and then increments the PFPA address and the PFLA address;

(e) for each incrementation of the PFLA address, the limit checking logic compares the CSLA address with the PFLA address to determine if the CSLA address is within the prefetch block designated by such prefetch address, and if so, sets a segment limit violation state including the location of the segment limit within the prefetch block;

(f) in response to a COF that results in BTC hit and the output of corresponding target address information used to generate a prefetch address for a corresponding target prefetch block, the limit checking logic compares at least a portion of the CSLA address to at least a portion of the target address information to detect a potential segment limit violation indicating that the CSLA address is potentially within such target prefetch block;

(e) if a potential segment limit violation is detected, the limit checking logic asserts a potential segment limit violation state, including a potential segment limit location, that inhibits the transfer to the decoder of any instruction bytes in the target prefetch block beyond the potential segment limit;

(f) in response to the generation of a target linear address in the address calculation stage, the limit checking logic compares at least the portion of the target linear address that was not used in detecting the potential segment limit violation with the corresponding portion of the CSLA address, and if they do not match, the potential segment limit violation state is deasserted.

2. The processor of claim 1 wherein the target information supplied by the BTC comprises the low order part of the LA and no part of the high order part.

3. The processor of claim 1, wherein the CSLA, PFLA, and PFPA addresses are stored in separate registers.

4. A processor implementing a scheme for detecting segment limit violations for COF (change-of-flow) targets when a branch unit does not supply the target linear address, the processor using a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same), comprising:

(a) prefetch means for issuing prefetch addresses for prefetch blocks of instruction bytes, and for loading prefetch blocks of instruction bytes into a prefetch buffer for transfer to a decoder;

(b) branch target means for providing, for selected COF instructions, target address information that is used to generate a prefetch address, the target address information including at least a portion of the low order part of the LA but not including all of the high order part of the LA;

(c) limit checking means for storing
 (i) a CSLA address corresponding to the linear address of the segment limit;
 (ii) a PFLA address corresponding to the linear address of the next prefetch address to be issued by the prefetch means;
 (iii) a PFPA address corresponding to the physical address of the next prefetch address to be issued by the prefetch means;

(d) for sequential prefetching, the prefetch means issues a prefetch address corresponding to the PFPA address, and then increments the PFPA address and the PFLA address;

(e) for each incrementation of the PFLA address, the limit checking means compares the CSLA address with the PFLA address to determine if the CSLA address is within the prefetch block designated by such prefetch address, and if so, sets a segment limit violation state including the location of the segment limit within the prefetch block;

(f) in response to a COF that results in a hit in the branch target means and the output of corresponding target address information used to generate a prefetch address for a corresponding target prefetch block, the limit checking means comparing at least a portion of the CSLA address to at least a portion of the target address information to detect a potential segment limit violation indicating that the CSLA address is potentially within such target prefetch block;

(e) if a potential segment limit violation is detected, the limit checking means asserting a potential segment limit violation state, including a potential segment limit location, thereby inhibiting the transfer to the decoder of any instruction bytes in the target prefetch block beyond the potential segment limit;

(f) in response to the generation of a target linear address in the address calculation stage, the limit checking means comparing at least the portion of the target linear address that was not used in detecting the potential segment limit violation with the corresponding portion of the CSLA address, and if they do not match, the potential segment limit violation state is deasserted.

5. The processor of claim 4, wherein the target information supplied by the BTC comprises the low order part of the LA and no part of the high order part.

6. The processor of claim 4 wherein the CSLA, PFLA, and PFPA addresses are stored in separate registers.

7. A method for detecting segment limit violations for COF (change-of-flow) targets when a branch unit does not supply the target linear address, implemented in a processor using a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same), comprising the steps:

(a) issuing prefetch addresses for prefetch blocks of instruction bytes, and for loading prefetch blocks of instruction bytes into a prefetch buffer for transfer to a decoder;

(b) outputting, for selected COF instructions, target address information that is used to generate a prefetch address, the target address information including at least a portion of the low order part of the LA but not including all of the high order part of the LA;

(c) storing
 (i) a CSLA address corresponding to the linear address of the segment limit;
 (ii) a PFLA address corresponding to the linear address of the next prefetch address to be issued;
 (iii) a PFPA address corresponding to the physical address of the next prefetch address to be issued;

(d) for sequential prefetching, the prefetch means issues a prefetch address corresponding to the PFPA address, and then increments the PFPA address and the PFLA address;

(e) for each incrementation of the PFLA address, comparing the CSLA address with the PFLA address to determine if the CSLA address is within the prefetch block designated by such prefetch address, and if so, sets a segment limit violation state including the location of the segment limit within the prefetch block;

(f) in response to a COF that results in the output of corresponding target address information used to generate a prefetch address for a corresponding target prefetch block, comparing at least a portion of the CSLA address to at least a portion of the target address information to detect a potential segment limit violation indicating that the CSLA address is potentially within such target prefetch block;

(e) if a potential segment limit violation is detected, asserting a potential segment limit violation state, including a potential segment limit location, thereby inhibiting the transfer to the decoder of any instruction bytes in the target prefetch block beyond the potential segment limit;

(f) in response to the generation of a target linear address in the address calculation stage, comparing at least the portion of the target linear address that was not used in detecting the potential segment limit violation with the corresponding portion of the CSLA address, and if they do not match, deasserting the potential segment limit violation state.

8. The segment limit detection method of claim 7, wherein the target information comprises the low order part of the LA and no part of the high order part.

9. A computer system including a processor that implements a scheme for detecting segment limit violations for COF (change-of-flow) targets when a branch unit does not supply the target linear address, the processor using a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same), comprising:

(a) a memory subsystem including system memory external to the processor;

(b) a prefetch unit that issues prefetch addresses for prefetch blocks of instruction bytes stored in the memory subsystem, and loads prefetch blocks of instruction bytes into a prefetch buffer for transfer to a decoder;

(c) a branch unit having a branch target cache (BTC) that for selected COF instructions provides target address information that is used to generate a prefetch address, the target address information including at least a portion of the low order part of the LA but not including all of the high order part of the LA;

(d) limit checking logic that stores
 (i) a CSLA address corresponding to the linear address of the segment limit;
 (ii) a PFLA address corresponding to the linear address of the next prefetch address to be issued by the prefetch unit;
 (iii) a PFPA address corresponding to the physical address of the next prefetch address to be issued by the prefetch unit;

(e) for sequential prefetching, the prefetch unit issues a prefetch address corresponding to the PFPA address, and then increments the PFPA address and the PFPA address;

(f) for each incrementation of the PFLA address, the limit checking logic compares the CSLA address with the PFLA, address to determine if the CSLA address is within the prefetch block designated by such prefetch address, and if so, sets a segment limit violation state including the location of the segment limit within the prefetch block;

(g) in response to a COF that results in BTC hit and the output of corresponding target address information used to generate a prefetch address for a corresponding target prefetch block, the limit checking logic compares at least a portion of the CSLA address to at least a portion of the target address information to detect a potential segment limit violation indicating that the CSL address is potentially within such target prefetch block;

(h) if a potential segment limit violation is detected, the limit checking logic asserts a potential segment limit violation state, including a potential segment limit location, that inhibits the transfer to the decoder of any instruction bytes in the target prefetch block beyond the potential segment limit;

(i) in response to the generation of a target linear address in the address calculation stage, the limit checking logic compares at least the portion of the target linear address that was not used in detecting the potential segment limit violation with the corresponding portion of the CSLA address, and if they do not match, the potential segment limit violation state is deasserted.

10. The computer system of claim 9 wherein the target information supplied by the BTC comprises the low order part of the LA and no part of the high order part.

11. A method for detecting segment limit violations for COF (change-of-flow) targets when a branch unit does not supply the target linear address, implemented in a computer system including a processor using a segmented and paged memory management model in which an address calculation stage generates a segmented linear address (LA) with high and low order parts (the code segment limit being defined by the segment base address and a segment limit), and if paging is enabled, generates a physical address (PA) by translating the high order part of the linear address (the low order part of the LA and the PA are the same), comprising the steps:

(a) storing prefetch blocks of instruction bytes in a memory subsystem including system memory external to the processor;

(b) issuing prefetch addresses for prefetch blocks of instruction bytes, and for loading prefetch blocks of instruction bytes into a prefetch buffer for transfer to a decoder;

(c) providing, for selected COF instructions, target address information that is used to generate a prefetch address, the target address information including at least a portion of the low order part of the LA but not including all of the high order part of the LA;

(d) storing
 (i) a CSLA address corresponding to the linear address of the segment limit;
 (ii) a PFLA address corresponding to the linear address of the next prefetch address to be issued;
 (iii) a PFPA address corresponding to the physical address of the next prefetch address to be issued;

(e) for sequential prefetching, the prefetch means issues a prefetch address corresponding to the PFPA address, and then increments the PFPA address and the PFLA address;

(f) for each incrementation of the PFLA address, comparing the CSLA address with the PFLA address to determine if the CSLA address is within the prefetch block designated by such prefetch address, and if so, sets a segment limit violation state including the location of the segment limit within the prefetch block;

(g) in response to a COF that results in the output of corresponding target address information used to generate a prefetch address for a corresponding target prefetch block, comparing at least a portion of the CSLA address to at least a portion of the target address information to detect a potential segment limit violation indicating that the CSLA address is potentially within such target prefetch block;

(h) if a potential segment limit violation is detected, asserting a potential segment limit violation state, including a potential segment limit location, thereby inhibiting the transfer to the decoder of any instruction bytes in the target prefetch block beyond the potential segment limit;
 (i) in response to the generation of a target liner address in the address calculation stage, comparing at least the portion of the target linear address that was not used in detecting the potential segment limit violation with the corresponding portion of the CSLA address, and if they do not match, deasserting the potential segment limit violation state.

12. The segment limit detection method of claim 11, wherein the target information comprises the low order part of the LA and no part of the high order part.

* * * * *